(12) United States Patent
Fitzgerald et al.

(10) Patent No.: US 11,725,402 B2
(45) Date of Patent: *Aug. 15, 2023

(54) FORMLINER FOR FORMING A PATTERN IN CURABLE MATERIAL AND METHOD OF USE

(71) Applicant: PRIME FORMING & CONSTRUCTION SUPPLIES, INC., Santa Ana, CA (US)

(72) Inventors: Edward Daniel Fitzgerald, Laguna Beach, CA (US); Brian Eugene Sheehan, Mission Viejo, CA (US)

(73) Assignee: PRIME FORMING & CONSTRUCTION SUPPLIES, INC., Santa Ana, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/339,836

(22) Filed: Jun. 4, 2021

(65) Prior Publication Data
US 2021/0362371 A1    Nov. 25, 2021

Related U.S. Application Data

(63) Continuation of application No. 16/563,700, filed on Sep. 6, 2019, now Pat. No. 11,027,455, which is a
(Continued)

(51) Int. Cl.
*E04G 9/10* (2006.01)
*B28B 7/00* (2006.01)
(Continued)

(52) U.S. Cl.
CPC ............... *E04G 9/10* (2013.01); *B28B 7/0073* (2013.01); *B29C 39/00* (2013.01); *E04F 21/04* (2013.01); *E04F 13/02* (2013.01)

(58) Field of Classification Search
CPC .......... B28B 7/0073; E04G 9/10; E04F 21/04; E04F 13/02; B29C 39/00
(Continued)

(56) References Cited

U.S. PATENT DOCUMENTS

| 405,800 A | 6/1889 | Ransome |
|---|---|---|
| 415,772 A | 11/1889 | Fiske |

(Continued)

FOREIGN PATENT DOCUMENTS

| CN | 2318016 Y | 5/1999 |
|---|---|---|
| CN | 101137805 A | 3/2008 |

(Continued)

OTHER PUBLICATIONS

International Search Report and Written Opinion received in corresponding PCT Application No. PCT/US2009/058489, dated Feb. 10, 2010, 14 pages.

(Continued)

*Primary Examiner* — Michael Safavi
(74) *Attorney, Agent, or Firm* — Knobbe, Martens, Olson & Bear, LLP

(57) ABSTRACT

Features for formliners to form a decorative pattern in a curable material and methods of using the same are disclosed. An improved formliner is disclosed with substantially seamlessly connecting components that reduces the need for using adhesives for interconnecting a plurality of formliners in a pattern. Further, the formliner is configured to reduce and/or substantially eliminate visible seams in order to create a more natural appearance in a finished product of the curable material.

25 Claims, 19 Drawing Sheets

Related U.S. Application Data continuation of application No. 16/066,571, filed as application No. PCT/US2016/036598 on Jun. 9, 2016, now Pat. No. 10,406,721.

(60) Provisional application No. 62/272,021, filed on Dec. 28, 2015.

(51) Int. Cl.
  *E04F 21/04* (2006.01)
  *B29C 39/00* (2006.01)
  *E04F 13/02* (2006.01)

(58) Field of Classification Search
  USPC .................................. 249/15, 16; 52/314, 315
  See application file for complete search history.

(56) References Cited

U.S. PATENT DOCUMENTS

| | | |
|---|---|---|
| 448,732 A | 3/1891 | Sagendorph |
| 483,240 A | 9/1892 | Sagendorph |
| 1,564,578 A | 12/1925 | Kennedy |
| 1,592,591 A | 7/1926 | Amele |
| 1,635,093 A | 7/1927 | McPherson et al. |
| 1,636,396 A | 7/1927 | Urschel |
| 1,669,639 A | 5/1928 | Graham |
| 1,734,826 A | 11/1929 | Israel |
| 1,750,511 A | 3/1930 | Dunn |
| 1,809,504 A | 6/1931 | Carvel |
| 1,961,627 A | 6/1934 | Wilber |
| 2,209,283 A | 7/1940 | Ronzone |
| 2,241,898 A | 5/1941 | Bawtenheimer |
| 2,245,047 A | 6/1941 | Odell |
| 2,246,377 A | 6/1941 | Mattes |
| 2,339,489 A | 1/1944 | Kublanow |
| 2,397,388 A | 3/1946 | Troedsson |
| 2,595,142 A | 4/1952 | Herck |
| 2,616,145 A | 11/1952 | Dufford |
| 2,627,100 A | 2/1953 | Tom |
| 2,627,744 A | 2/1953 | Lopina |
| 2,807,070 A | 9/1957 | Thomas |
| 2,931,130 A | 4/1960 | Rietz |
| 3,096,195 A | 7/1963 | Seman et al. |
| 3,177,279 A | 4/1965 | Bilodeau |
| 3,426,490 A | 2/1969 | Taylor |
| 3,511,004 A | 5/1970 | Snellings |
| 3,524,790 A | 8/1970 | Mason |
| 3,602,476 A | 8/1971 | Iragorri |
| 3,657,849 A | 4/1972 | Garton |
| 3,664,630 A | 5/1972 | Maynen et al. |
| 3,678,887 A | 7/1972 | Smith |
| 3,692,458 A | 9/1972 | Kirsch |
| 3,780,977 A | 12/1973 | Dashew |
| 3,820,295 A | 6/1974 | Folley |
| 3,868,801 A | 3/1975 | Weiner |
| 3,974,602 A | 8/1976 | Pohl et al. |
| 4,015,391 A | 4/1977 | Epstein et al. |
| 4,026,083 A | 5/1977 | Hoyt et al. |
| 4,061,809 A | 12/1977 | Mautner |
| 4,211,504 A | 7/1980 | Sivachenko |
| 4,265,443 A | 5/1981 | Berthelot |
| 4,290,248 A | 9/1981 | Kemerer et al. |
| 4,407,480 A | 10/1983 | Trimmer et al. |
| 4,495,738 A | 1/1985 | Sheber |
| 4,557,086 A | 12/1985 | Liefer et al. |
| 4,576,536 A | 3/1986 | Benuzzi |
| 4,695,033 A | 9/1987 | Imaeda et al. |
| 4,741,137 A | 5/1988 | Barratt |
| 4,773,790 A | 9/1988 | Hagenah |
| 4,858,410 A | 8/1989 | Goldman |
| 4,888,928 A | 12/1989 | Rea et al. |
| 4,932,182 A | 6/1990 | Thomasson |
| 4,986,726 A | 1/1991 | Benuzzi et al. |
| 5,002,817 A | 3/1991 | Jones |
| 5,009,387 A | 4/1991 | Scott et al. |
| 5,061,161 A | 10/1991 | Tetu |
| D330,435 S | 10/1992 | Dukart et al. |
| 5,268,137 A | 12/1993 | Scott et al. |
| 5,347,784 A | 9/1994 | Crick et al. |
| 5,372,349 A | 12/1994 | Elmore |
| 5,487,526 A | 1/1996 | Hupp |
| 5,501,049 A | 3/1996 | Francis et al. |
| 5,537,792 A | 7/1996 | Moliere |
| 5,632,922 A | 5/1997 | Nasvik et al. |
| 5,887,846 A | 3/1999 | Hupp |
| 6,041,567 A | 3/2000 | Passeno |
| 6,086,172 A | 7/2000 | Lee |
| 6,129,329 A | 10/2000 | Nasvik |
| 6,324,812 B1 | 12/2001 | Drya-Lisiecka |
| 6,421,975 B2 | 7/2002 | Bryant et al. |
| 6,516,578 B1 | 2/2003 | Hunsaker |
| D479,614 S | 9/2003 | Scott et al. |
| 6,631,598 B2 | 10/2003 | Raineri |
| 6,634,617 B2 | 10/2003 | Potvin |
| 6,715,250 B2 | 4/2004 | Bryant et al. |
| 6,857,248 B2 | 2/2005 | Ouellet et al. |
| 6,955,019 B2 | 10/2005 | Donlin et al. |
| 7,306,757 B2 | 12/2007 | Harrington |
| 7,313,863 B2 | 1/2008 | Li et al. |
| 7,513,523 B2 | 4/2009 | Bayley et al. |
| 7,527,236 B2 | 5/2009 | Nasvik |
| 7,626,242 B2 | 12/2009 | Krishnan |
| 7,647,738 B2 | 1/2010 | Nasvik |
| 7,658,050 B2 | 2/2010 | Bouchard et al. |
| 7,790,784 B2 | 9/2010 | Nasr |
| 7,840,890 B2 | 11/2010 | Lund |
| 7,856,780 B2 | 12/2010 | Durnberger |
| 7,871,054 B2 | 1/2011 | Walters |
| 7,901,757 B2 | 3/2011 | Strout et al. |
| 7,955,550 B2 | 6/2011 | Polk, Jr. et al. |
| 7,963,499 B2 | 6/2011 | Fitzgerald et al. |
| 8,074,957 B2 | 12/2011 | Fitzgerald et al. |
| 8,151,530 B2 | 4/2012 | Schwarz |
| 8,166,882 B2 | 5/2012 | Yang |
| 8,181,930 B2 | 5/2012 | Fasching |
| 8,205,404 B2 | 6/2012 | Vermeulen et al. |
| 8,297,016 B2 | 10/2012 | Sukup et al. |
| 8,321,237 B2 | 11/2012 | Dogac et al. |
| 8,365,491 B2 | 2/2013 | Schrunk |
| 8,387,167 B2 | 3/2013 | Matsunobu et al. |
| D696,870 S | 1/2014 | Vidal Soler |
| 8,621,801 B2 | 1/2014 | Bouchard |
| 8,623,257 B2 | 1/2014 | Fitzgerald et al. |
| 8,636,261 B2 | 1/2014 | Walters et al. |
| D701,623 S | 3/2014 | Vidal Soler |
| D701,625 S | 3/2014 | Vidal Soler |
| 8,662,467 B2 | 3/2014 | Fasching et al. |
| D701,976 S | 4/2014 | Vidal Soler |
| 8,697,937 B2 | 4/2014 | Roe et al. |
| 8,697,938 B2 | 4/2014 | Roe et al. |
| 8,708,326 B2 | 4/2014 | Egli et al. |
| 8,741,410 B2 | 6/2014 | Cattacin et al. |
| 8,824,129 B2 | 9/2014 | Wang et al. |
| D715,459 S | 10/2014 | Perry |
| 8,863,461 B2 | 10/2014 | Wagner et al. |
| 8,888,067 B1 | 11/2014 | Calmes |
| 8,992,203 B2 | 3/2015 | Fitzgerald et al. |
| 9,027,302 B2 | 5/2015 | Buoni |
| D740,449 S | 10/2015 | Huang |
| 9,169,652 B2 | 10/2015 | Steffes |
| 9,528,274 B2 | 12/2016 | Curtis |
| 9,574,308 B2 | 2/2017 | Castonguay et al. |
| D791,364 S | 7/2017 | Sheehan et al. |
| 9,909,322 B1 | 3/2018 | Sadleir |
| D818,612 S | 5/2018 | Elmaagacli |
| 10,137,598 B2 | 11/2018 | Fitzgerald et al. |
| 10,406,721 B2 | 9/2019 | Fitzgerald et al. |
| D875,277 S | 2/2020 | Sheehan et al. |
| 10,723,040 B2 | 7/2020 | Fitzgerald et al. |
| 11,027,455 B2 | 6/2021 | Fitzgerald et al. |
| 11,274,457 B2 | 3/2022 | Sheehan et al. |
| 2001/0005565 A1 | 6/2001 | Fujimoto |
| 2001/0020669 A1 | 9/2001 | Potvin |
| 2001/0025554 A1 | 10/2001 | Benuzzi |

(56) References Cited

U.S. PATENT DOCUMENTS

| | | |
|---|---|---|
| 2002/0135987 A1 | 9/2002 | Baldwin et al. |
| 2004/0194421 A1 | 10/2004 | Canti |
| 2005/0064128 A1 | 3/2005 | Lane et al. |
| 2005/0097827 A1 | 5/2005 | Jordan |
| 2005/0144763 A1 | 7/2005 | Boville |
| 2005/0184441 A1 | 8/2005 | Munneke |
| 2005/0188642 A1 | 9/2005 | Correia |
| 2005/0210811 A1 | 9/2005 | Nasvik |
| 2006/0003132 A1 | 1/2006 | Correia et al. |
| 2006/0008619 A1 | 1/2006 | Campbell et al. |
| 2006/0091282 A1 | 5/2006 | Walters |
| 2006/0157634 A1 | 7/2006 | Nasvik |
| 2006/0180731 A1 | 8/2006 | Scott et al. |
| 2006/0197257 A1 | 9/2006 | Burt |
| 2007/0130860 A1 | 6/2007 | Paquette |
| 2007/0137127 A1 | 6/2007 | Lincoln |
| 2007/0137128 A1 | 6/2007 | Viau |
| 2007/0166102 A1 | 7/2007 | Cornaz |
| 2007/0175261 A1 | 8/2007 | Hornig et al. |
| 2007/0217865 A1 | 9/2007 | Castonguay et al. |
| 2008/0099985 A1 | 5/2008 | Ogawa |
| 2008/0107765 A1 | 5/2008 | Considine et al. |
| 2008/0143040 A1 | 6/2008 | Chung et al. |
| 2008/0156205 A1 | 7/2008 | Hering |
| 2008/0164294 A1 | 7/2008 | Hafner |
| 2008/0222986 A1 | 9/2008 | Hamel |
| 2008/0233352 A1 | 9/2008 | Smith et al. |
| 2008/0233377 A1 | 9/2008 | Smith et al. |
| 2008/0319409 A1 | 12/2008 | Roe et al. |
| 2008/0319410 A1 | 12/2008 | Roe et al. |
| 2009/0062413 A1 | 3/2009 | Adur et al. |
| 2009/0092461 A1 | 4/2009 | Bubulka et al. |
| 2009/0100774 A1 | 4/2009 | Fasching et al. |
| 2009/0294896 A1 | 12/2009 | Krishnan |
| 2009/0295062 A1 | 12/2009 | Sheng |
| 2010/0015405 A1 | 1/2010 | Bechtold et al. |
| 2010/0166997 A1 | 7/2010 | Chisaka et al. |
| 2010/0236175 A1 | 9/2010 | King |
| 2011/0061323 A1 | 3/2011 | Schwarz |
| 2011/0289867 A1 | 12/2011 | Balbo Di Vinadio |
| 2012/0245545 A1 | 9/2012 | Roe et al. |
| 2012/0322333 A1 | 12/2012 | Melamed et al. |
| 2013/0026896 A1 | 1/2013 | Chang et al. |
| 2013/0075576 A1 | 3/2013 | Calmes |
| 2013/0104616 A1 | 5/2013 | Masek et al. |
| 2013/0216754 A1 | 8/2013 | Chisaka et al. |
| 2013/0232710 A1 | 9/2013 | Policicchio |
| 2013/0341258 A1 | 12/2013 | Sekora |
| 2014/0076505 A1 | 3/2014 | Mullet et al. |
| 2014/0131368 A1 | 5/2014 | Dygert et al. |
| 2014/0171897 A1 | 6/2014 | Roe et al. |
| 2014/0173844 A1 | 6/2014 | Pickard, III |
| 2014/0183808 A1 | 7/2014 | Egli et al. |
| 2014/0183809 A1 | 7/2014 | Egli et al. |
| 2014/0202106 A1 | 7/2014 | Wagner et al. |
| 2014/0202109 A1 | 7/2014 | Michalski et al. |
| 2014/0239585 A1 | 8/2014 | Doucet et al. |
| 2014/0242330 A1 | 8/2014 | Song |
| 2014/0251764 A1 | 9/2014 | Gieser et al. |
| 2015/0218829 A1 | 8/2015 | Curtis |
| 2016/0010346 A1 | 1/2016 | Calmes |
| 2016/0237704 A1 | 8/2016 | Sheehan |
| 2018/0243956 A1 | 8/2018 | Salenius |
| 2020/0256072 A1 | 8/2020 | Sheehan et al. |
| 2022/0268038 A1 | 8/2022 | Sheehan et al. |

FOREIGN PATENT DOCUMENTS

| | | |
|---|---|---|
| CN | 101563238 A | 10/2009 |
| CN | 102224309 A | 10/2011 |
| DE | 8906516 U1 | 9/1989 |
| EP | 0338663 A1 | 10/1989 |
| EP | 1308253 A1 | 5/2003 |
| GB | 363637 | 12/1931 |
| JP | 62-49518 U | 3/1987 |
| TW | 299383 B | 3/1997 |
| WO | WO 2010/036971 A1 | 4/2010 |
| WO | WO 2014/088391 A1 | 6/2014 |

OTHER PUBLICATIONS

International Preliminary Report on Patentability and Written Opinion of the International Searching Authority received in corresponding PCT Application No. PCT/US2009/058489, dated Mar. 29, 2011, 7 pages.

International Search Report and Written Opinion received in corresponding PCT Application No. PCT/US2016/036598, dated Sep. 6, 2016, 11 pages.

Supplementary European Search Report issued in European Patent Application No. 16882215.3, dated Aug. 9, 2019, in 9 pages.

Extended European Search Report issued in European Patent Application No. 19202687.0, dated Mar. 23, 2020, in 7 pages.

Extended European Search Report issued in European Patent Application No. EP 21168024.4, dated Jul. 23, 2021, in 8 pages.

Custom Rock 12019 Formliner Ashlar I Hunt Valley Distributors (on-line), no date available. Retrieved from Internet Jul. 16, 2019, URL: https://www.huntvalleydistributors.com/custom-rock-12019-formliner-ashlar (2 pages).

Innovative Brick Systems LLC, "Techinical Design and Installation Guide for the MBrick Versa Liner", Sep. 2004, www.innovativebrick.com, Rev. 3.

Masonry—Fitzgerald Formliners (on-line), dated Nov. 29, 2017. Retrieved from Internet Jul. 16, 2019, URL: https://web.archive.org/web/20171129183821/https://formliners.com/masonry/ (3 pages) (Year: 2017).

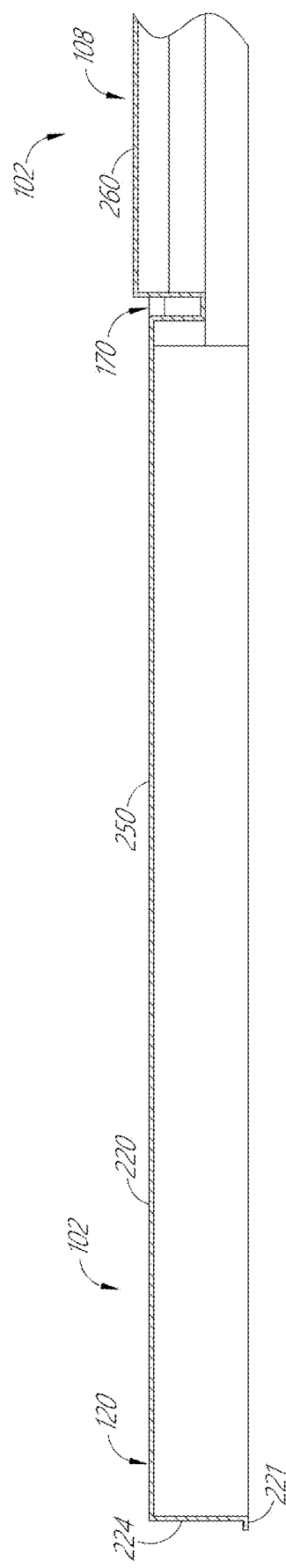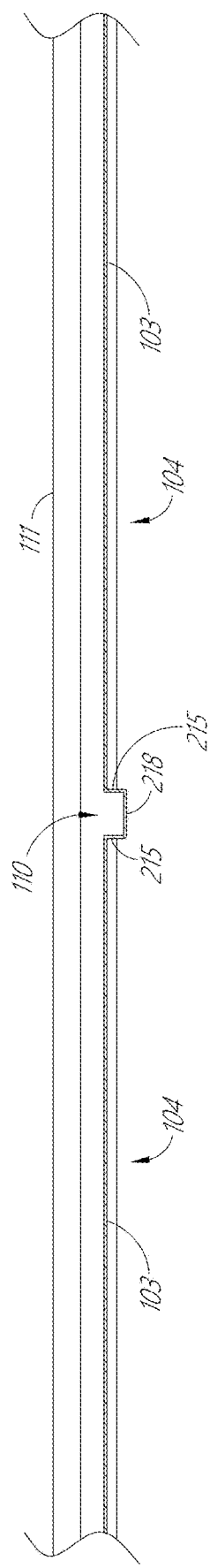

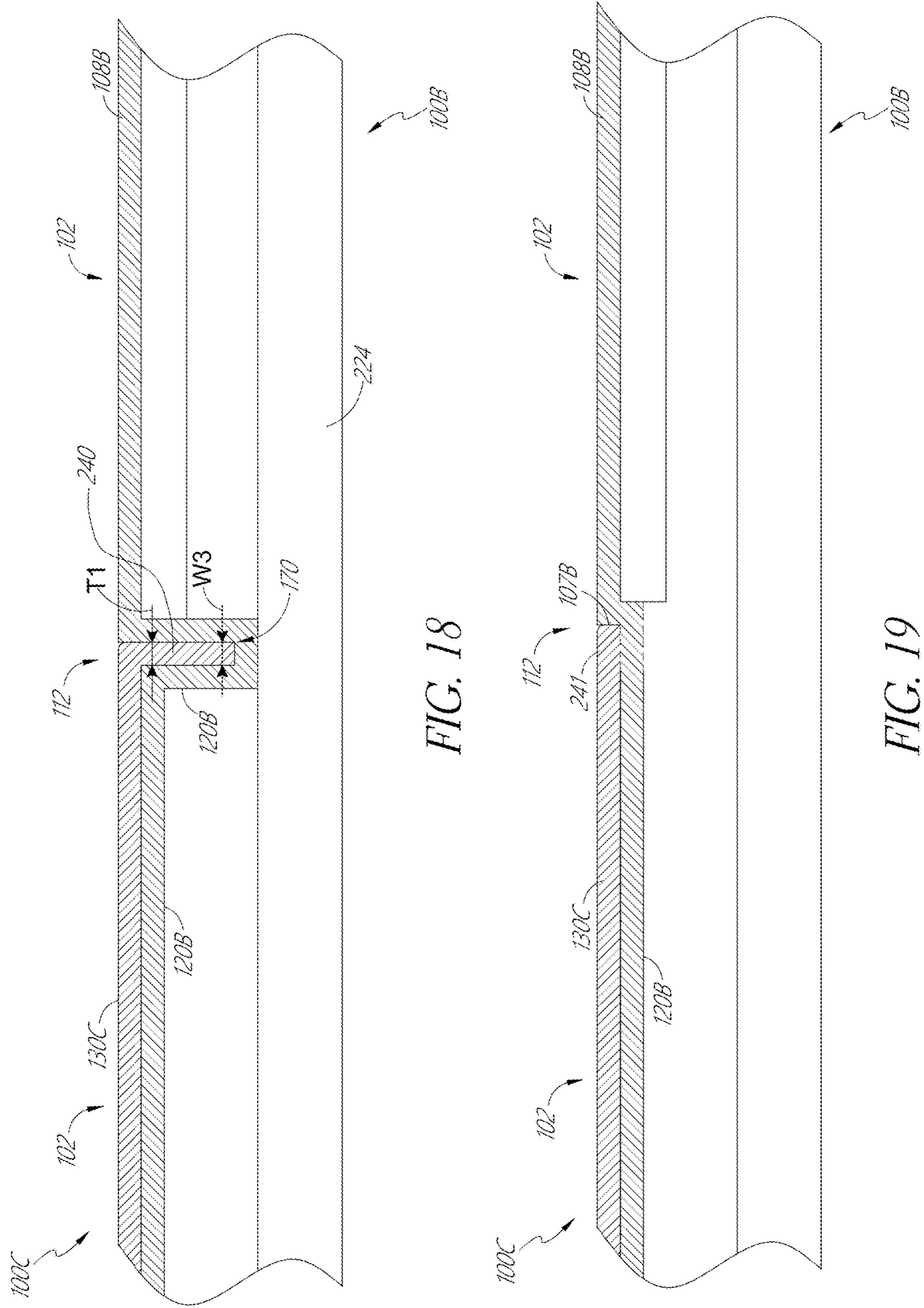

FORMLINER FOR FORMING A PATTERN IN CURABLE MATERIAL AND METHOD OF USE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to formliners and methods of using the same. More specifically, the present disclosure relates to an improved formliner for creating a desired pattern in curable material while minimizing visible seams in the curable material.

Description of the Related Art

Decorative masonry and concrete construction have become increasingly popular in recent years. The façades of homes and other buildings that had previously been constructed in very simple and plain concrete are now being replaced with either decorative stone and brick or decorative concrete construction.

As a result of the increased demand for stone and brick work, various improvements have been made in stone and brick masonry and concrete construction. These improvements have lowered the cost for such construction by decreasing the time or skill requirements previously needed to perform such work.

For example, in stone and brick masonry, facings and floors have been traditionally constructed by skilled artisans from individual units. However, recent advances have been made in the masonry art which allow artisans to more quickly and accurately perform stone or brick work. In particular, various panels, forms, and mounting systems have been developed that allow individual units to be placed in precise geometric patterns, thus eliminating much of the painstaking effort usually expended by the artisan. This now allows generally unskilled artisans, such as the do-it-yourselfer, to create a high-quality product.

Perhaps more importantly for projects with a tighter budget, advances in concrete construction now allow artisans to create a faux stone or brick appearance in concrete with a formliner. As a result, one may achieve the appearance of stone or brick without the associated cost.

A concrete and/or other curable material formliner generally comprises an interior surface onto which concrete and/or other curable material is poured. The interior surface of the formliner typically includes a desired pattern or shape that will be transferred to the concrete and/or other curable material to form a cured concrete and/or other curable material casting. In many cases, the formliner is lined up with additional formliners to create a pattern over a wide area.

After the concrete and/or other curable material has cured, the formliners are removed from the exposed surface of the concrete and/or other curable material, thus revealing the desired pattern or shape. Such patterns or shapes can include faux stone or brick, wave patterns, emblems, etc.

SUMMARY

As noted above, in recent years, significant advances have been made in the art of concrete and/or other curable material laying. Various techniques and equipment have been developed that allow for the creation of decorative patterns in the concrete and/or other curable material, especially a faux stone or brick appearance. The results of such techniques and equipment provide the appearance of stone, brick, or other pattern without the cost. The concrete and/or other curable material casting can be created in a horizontal (such as for tilt up construction) or vertical casting process, and can be pre-cast, or cast-at-site construction.

The present disclosure discloses an improved formliner with seamlessly connecting components that eliminates the need for using adhesives for interconnecting a plurality of formliners in a pattern. Further, the formliner is configured to reduce and/or substantially eliminate visible seams in order to create a more natural appearance in a finished product.

A formliner can have at least one cell bound and/or circumscribed by a system of ribs. The cell can include a decorative pattern to be created in concrete and/or other curable material. The ribs can include an overlapping section that overlays onto an overlapped section when multiple formliners are interconnected. The overlapping section can be connected to the cell of the formliner via a channel and/or groove. The channel and/or groove can extend along a boundary or periphery of the cell between the cell and the ribs. The channel and/or groove can extend into or past the decorative pattern in the cell. The channel and/or groove can be sized and positioned to engage, accept, mate, and/or connect with an edge of the overlapping section when the overlapping section is overlaid onto the overlapped section. By positioning, inserting, and/or extending the edge of the overlapping section in/into the channel, seams in curable material can be minimized and/or substantially eliminated (e.g., seams that would be formed in the curable material by a free edge of the overlapping section such as an edge of the overlapping section not positioned in a channel and/or groove when the overlapping section is overlaid onto the overlapped section).

According to at least one of the formliners disclosed herein is the realization that in using multiple formliners, seams may be created between the formliners where the formliners meet. For example, in order to create a large pattern or casting with prior art formliners, the formliners are merely placed together using butt joints, thus creating significant visible seams between the formliners. As a result, the appearance of the exposed surface of the concrete is compromised. An unsightly seam is very easy to notice and takes a substantial amount of time and effort to remove from cured concrete. Further, in large-scale projects, it may be too costly to re-work the cured concrete and/or other material in order to remove the seams. As such, the seams are simply left in place resulting in an inferior concrete and/or other material product.

Thus, the present disclosure discloses formliners for forming patterns and methods of use of the formliners that minimize, reduce, and/or substantially eliminate undesirable seams. For example, the formliner can have one or more cells and one or more raised sections or ribs, wherein the formliner is shaped and configured to be interconnected with other such formliners to create a pattern or array of formliners which nest with each other such that an applied material provides a natural appearance and substantially does not show seaming between the formliners that were interconnected, connected, and/or assembled to create the pattern. As discussed herein, there are various features that can be incorporated into this broad conception of the formliner in order to provide various features of the formliner. In the present description, the disclosed features can optionally be incorporated into the above-noted formliner and its method of use in any combination. Additionally, Applicants describe some of these features and methods in patent applications, such as International Patent Application No. PCT/US2009/058489, filed Sep. 25, 2009, U.S. patent application Ser. No. 12/406,896, filed Mar. 18, 2009, U.S. patent application Ser. No. 12/850,510, filed Aug. 4, 2010, U.S. patent application Ser. No. 12/238,294, filed Sep. 25, 2008, and U.S. Provisional Application No. 62/116,407, filed Feb. 14, 2015, the entireties of each of which are incorporated herein by reference and made a part of this specification.

According to this disclosure, a formliner for creating a pattern in curable material includes one or more of the following: a cell comprising a contact surface configured to face curable material in use, the contact surface comprising a decorative pattern to be created in the curable material, the decorative pattern comprising a varying depth; a rib system comprising a plurality of ribs extending along the cell and forming at least a part of a boundary of the cell; and/or a channel extending along at least a portion of the boundary of the cell, the channel extending into the cell at least an extent of the varying depth of the decorative pattern at the boundary of the cell. The rib system includes one or more of the following: an overlapping section connected with the cell and comprising a first rib edge, the overlapping section configured to face the curable material in use; and/or an overlapped section connected with the cell and comprising a second rib edge, at least a portion of the overlapping section configured to overlay onto at least a portion of the overlapped section. The at least a portion of the first rib edge extends into the channel when the at least a portion of the overlapping section overlays onto the at least a portion of the overlapped section. The second rib edge extends along the boundary of the cell and toward a support surface to provide structural support to the overlapped section and the overlapping section when the at least a portion of the overlapping section overlays onto the at least a portion of the overlapped section with the formliner in use.

According to this disclosure, the formliner further includes one or more of the following: the channel connects the cell to the overlapped section along the at least a portion of the boundary of the cell; the channel connects the contact surface of the cell to the overlapped section along the at least a portion of the boundary of the cell; the channel has a width generally corresponding to a thickness of the formliner for the first rib edge to extend into the channel; the varying depth of the decorative pattern has a predetermined amplitude at the boundary of the cell corresponding to the extent of the varying depth at the boundary of the cell, and wherein the first rib edge has an extent equal to or greater than the predetermined amplitude at the boundary of the cell; the varying depth of the decorative pattern has a maximum amplitude in the cell, and wherein the maximum amplitude of the decorative pattern is greater than the extent of the varying depth at the boundary of the cell; an extent of the overlapping section is less than an extent of the overlapped section; the channel extends toward the support surface less than the second rib edge extends toward the support surface when the at least a portion of the overlapping section overlays onto the at least a portion of the overlapped section with the formliner in use; the second rib edge contacts the support surface to provide structural support to the overlapped section and the overlapping section when the at least a portion of the overlapping section overlays onto the at least a portion of the overlapped section with the formliner in use, and wherein an exterior surface of the channel facing the support surface does not contact the support surface; further comprising a plurality of cells each comprising a contact surface configured to face the curable material in use, wherein the plurality of ribs extend along at least two cells of the plurality of cells and form at least parts of boundaries of the at least two cells, wherein the channel extends along at least portions of boundaries of the at least two cells, and wherein the at least a portion of the first rib edge extends into the channel along the at least portions of boundaries of the at least two cells when the at least a portion of the overlapping section overlays onto the at least a portion of the overlapped section; the plurality of ribs is disposed between the plurality of cells to form boundaries of the plurality of cells; the plurality of cells define a generally rectangular shape; at least some of the plurality of cells have different sizes; the plurality of cells comprise opposing ends, the plurality of cells being arranged in a plurality of rows with each layer having at least two cells disposed end-to-end; cells of a first row of the plurality of rows are offset from cells of a second row of the plurality of rows; the channel extends at substantially a same level through at least one rib of the plurality of ribs between at least two cells of the plurality of cells; the first rib edge extends through the at least one rib of the plurality of ribs between the at least two cells of the plurality of cells in the channel; the overlapping section comprises an opening, and wherein the overlapped section is configured to extend through the opening; the opening is formed at least partially in the first rib edge; a first formliner is configured to be assembled with a second formliner by overlaying at least a portion of an overlapping section of the second formliner onto at least a portion of an overlapped section of the first formliner such that an exterior surface of the overlapping section of the second formliner is substantially flush with exterior surfaces of a rib system of the first formliner when the first and second formliners are assembled; the rib system further includes a plurality of non-overlap ribs; the rib system includes a transition zone between the non-overlap ribs and the overlapped section, the transition zone connecting the overlapped section with the non-overlap ribs; a first rib edge of the second formliner is positioned adjacent to a transition zone of the first formliner when the first and second formliners are assembled; the transition zone comprises a varying cross-sectional profile increasing from the overlapped section to the non-overlap ribs; the overlapping section of the second formliner comprises an opening, wherein the overlapped section of the first formliner extends through the opening of the second formliner such that the opening of the second formliner is adjacent to the transition zone of the first formliner when the first and second formliners are assembled; the first and second formliners are configured to be assembled with at least one other formliner by overlaying at least a portion of an overlapping section of the at least one other formliner onto at least an other portion of the overlapped section of the first formliner such that at least a portion of a first rib edge of the overlapping section of the at least one other formliner extends into the channel of the first formliner; the overlapped section of the first formliner comprises a cutout such that a part of the overlapped section of the first formliner corresponding to the cutout is not overlapped by the overlapping section of the second formliner when the first and second formliners are assembled; the cutout of the overlapped section of the first formliner is positioned at a corner of the first formliner, the corner of the first formliner formed by an intersection of ribs of the rib system of the first formliner; the overlapped or the overlapping section of the formliner comprises at least one cutout such that a part of the rib system directly faces the support surface corresponding to the cutout when the at least a portion of the overlapping section overlays onto the at least a portion of the overlapped section with the formliner in use; the at least one cutout of the overlapped or overlapping section of the formliner is positioned at at least one corner of the formliner, the at least one corner of the formliner formed by an intersection of ribs of the rib system of the formliner; the channel extends throughout the at least a portion of an overlapped section of the first formliner overlaid by the at least a portion of an overlapping section of the second formliner; the overlapping section comprises a first wall, a second wall connected to the first wall of the overlapping section, and a third wall connected to the second wall of the overlapping section, wherein the overlapped section comprises a first wall, a second wall connected to the first wall of the overlapped section, and a third wall connected to the second wall of the overlapped section, wherein the first wall of the overlapping section is configured to overlap the third wall of the overlapped section, wherein the second wall of the overlapping section is configured to overlap the second wall of the overlapped section, and wherein the third wall of the overlapping section is configured to overlap the first wall of the overlapped section; the first, second, and third walls of the overlapping and the overlapped sections are at substantially right angles to each other; the third wall of the overlapping section comprises the first rib edge; the third wall of the overlapped section comprises the second rib edge; an extent of the third wall of the overlapping section is less than an extent of the first wall of the overlapping section; exterior surfaces of the rib system are configured to face the curable material in use; at least some of the plurality of ribs are substantially polygonal shaped; the cell is generally a rectangular shape; the formliner comprises a first end and a second end, the first end being formed to include a first finger joint pattern and the second end being formed to include a second finger joint pattern that is complementary to the first finger joint pattern, wherein the first end is configured to be overlaid with the second end when the at least a portion of the overlapping section overlays onto the at least a portion of the overlapped section; the decorative pattern comprises a textured pattern bounded by the rib system, wherein placing the curable material against the contact surface forms a textured surface in an exposed surface of the curable material where the contact surface comprising the textured pattern directly contacts the exposed surface of the curable material; the textured pattern comprises at least one of brick, wood, rock, stone, faux stone, cut stone, sand stone, ledgestone, fieldstone, castle rock, river rock, or slate; an extent of first section from the cell toward the first rib edge is less than an extent of the second section from the cell toward the second rib edge; and/or the overlapping section has a first length from the cell toward the first rib edge and the overlapped section has a second length from the cell toward the second rib edge, and wherein the first length is about one fourth of the second length.

According to this disclosure, a formliner for use in creating a pattern in curable material includes one or more of the following: a cell comprising a base configured to face curable material in use, the base configured to create a pattern on the curable material; a rib system comprising a plurality of ribs extending along the cell and forming at least a part of a boundary of the cell; and/or a groove connecting at least a part of the cell to at least one rib of the plurality of ribs, the groove configured to accept the first rib end in the groove. The rib system includes one or more of the following: a first section connected with the cell and comprising a first rib end, the first section configured to face the curable material in use; and/or a second section connected with the cell and comprising a second rib end, at least a portion of the first section configured to overlap onto at least a portion of the second section. The at least a portion the first rib end is in the groove when the at least a portion of the first section overlaps onto the at least a portion of the second section.

According to this disclosure, the formliner further includes one or more of the following: the second rib end extends generally along a same direction as the first rib end when the at least a portion of the first section overlaps onto the at least a portion of the second section; the second rib end extends generally along the boundary of the cell; the second rib end extends toward a support surface to provide structural support to the first section and the second section when the at least a portion of the first section overlaps onto the at least a portion of the second section with the formliner in use; the second rib end contacts the support surface to provide structural support to the second section and the first section when the at least a portion of the first section overlaps onto the at least a portion of the second section with the formliner in use, and wherein an exterior surface of the groove facing the support surface does not contact the support surface; the second rib end extends past the base of the cell when the at least a portion of the first section overlaps onto the at least a portion of the second section; an extent of the first section from the cell toward the first rib end is less than an extent of the second section from the cell toward the second rib end; the first section has a first length from the cell toward the first rib end and the second section has a second length from the cell toward the second rib end, and wherein the first length is about one fourth of the second length; the groove connects the cell to the second section along at least a portion of the boundary of the cell; the groove connects the base of the cell to the second section along the at least a portion of the boundary of the cell; the groove has a width generally corresponding to a thickness of the formliner for the first rib end to be in the groove; the base has a contour along a general extent of the base, the contour changing with a predetermined magnitude at the boundary of the cell along the general extent of the base, and wherein the first rib end has an extent equal to or greater than the predetermined magnitude; the contour has a maximum magnitude in the cell, and wherein the maximum magnitude of the contour is greater than the predetermined magnitude at the boundary of the cell along the general extent of the base; an end of the groove lies in a different plane from a plane corresponding to an edge of the second rib end, the different plane and the plane corresponding to an edge of the second rib end extend generally along the base; further comprising a plurality of cells each comprising a base configured to face the curable material in use, wherein the plurality of ribs extend along at least two cells of the plurality of cells and form at least parts of boundaries of the at least two cells, wherein the groove extends along at least portions of boundaries of the at least two cells, and wherein at least a portion of the groove is configured to accept the first rib end in the groove along the at least portions of boundaries of the at least two cells when the at least a portion of the first section overlaps onto the at least a portion of the second section; the plurality of ribs are disposed between the plurality of cells to form boundaries of the cells; the plurality of cells define a generally rectangular shape; at least some of the plurality of cells have different sizes; the plurality of cells comprise opposing ends, the plurality of cells being arranged in a plurality of rows with each layer having at least two cells disposed end-to-end; cells of a first row of the plurality of rows are offset from cells of a second row of the plurality of rows; the groove extends at substantially a same level through at least one rib of the plurality of ribs between at least two cells of the plurality of cells; the first rib end extends through the at least one rib of the plurality of ribs between the at least two cells of the plurality of cells in the groove; the first section comprises an opening, and wherein the second section is configured to extend through the opening; the opening is formed at least partially in the first rib end; a first formliner is configured to be connected with a second formliner by overlapping at least a portion of a first section of the second formliner onto at least a portion of a second section of the first formliner such that an exterior surface of the first section of the second formliner is substantially flush with exterior surfaces of a rib system of the first formliner when the first and second formliners are assembled; the rib system includes a plurality of internal ribs; the rib system includes a transition zone between the internal ribs and the second section, the transition zone connecting the second section with the internal ribs; a first rib end of the second formliner is positioned adjacent to a transition zone of the first formliner when the first and second formliners are assembled; the transition zone comprises a varying cross-sectional profile increasing from the second section to the internal ribs; the first section of the second formliner comprises an opening, wherein the second section of the first formliner extends through the opening of the second formliner such that the opening of the second formliner is adjacent to the transition zone of the first formliner when the first and second formliners are assembled; the first and second formliners are configured to be connected with at least one other formliner by overlapping at least a portion of a first section of the at least one other formliner onto at least an other portion of the second section of the first formliner; at least a portion of a first rib edge of the first section of the at least one other formliner extends into the groove of the first formliner; the second section of the first formliner comprises a cutout such that a part of the second section of the first formliner corresponding to the cutout is not overlapped by the first section of the second formliner when the first and second formliners are connected; the cutout of the second section of the first formliner is positioned at a corner of the first formliner, the corner of the first formliner formed by an intersection of ribs of the rib system of the first formliner; the first or second section of the formliner comprises at least one cutout such that a part of the rib system of the formliner does not overlap an other part of the rib system corresponding to the cutout when the at least a portion of the first section overlays onto the at least a portion of the second section with the formliner in use; the at least one cutout of the first or second section of the formliner is positioned at at least one corner of the formliner, the at least one corner of the formliner formed by an intersection of the plurality of ribs of the rib system of the formliner; the groove extends throughout the at least a portion of a second section of the first formliner overlaid by the at least a portion of a first section of the second formliner; the first section comprises a first wall, a second wall connected to the first wall of the first section, and a third wall connected to the second wall of the first section, wherein the second section comprises a first wall, a second wall connected to the first wall of the second section, and a third wall connected to the second wall of the second section, wherein the first wall of the first section is configured to overlap the third wall of the second section, wherein the second wall of the first section is configured to overlap the second wall of the second section, and wherein the third wall of the first section is configured to overlap the first wall of the second section; the first, second, and third walls of the first and second sections are at substantially right angles to each other; the third wall of the first section comprises the first rib end; the third wall of the second section comprises the second rib end; an extent of the third wall of the first section is less than an extent of the first wall of the first section; exterior surfaces of the rib system are configured to face the curable material in use; at least some of the plurality of ribs are substantially polygonal shaped; the cell is generally a rectangular shape; the formliner comprises a first end and a second end, the first end being formed to include a first finger joint pattern and the second end being formed to include a second finger joint pattern that is complementary to the first finger joint pattern, wherein the first end is configured to be overlaid with the second end when the at least a portion of the first section overlaps onto the at least a portion of the second section; the pattern comprises a textured pattern bounded by the rib system, wherein placing the curable material against the base and the rib system forms a textured surface in an exposed surface of the curable material where the base comprising the textured pattern directly contacts the exposed surface of the curable material; and/or the textured pattern comprises at least one of brick, wood, rock, stone, faux stone, cut stone, sand stone, ledgestone, fieldstone, castle rock, river rock, or slate.

According to this disclosure, a formliner for use in creating a decorative pattern in curable material includes one or more of the following: a cell comprising a base configured to face curable material in use; and/or a channel connected to at least a portion of the cell at the base; and a rib system extending along the cell, the rib system comprising. The rib system includes one or more of the following: a first wall extending upwardly from the base; a second wall extending from first wall substantially in parallel with an extent of the base; a third wall extending downwardly from the second wall toward the extent of the base; a fourth wall extending upwardly from the channel; and a fifth wall extending from fourth wall substantially in parallel with the extent of the base; and/or a sixth wall extending downwardly from the fifth wall toward the extent of the base. The first, second, and third walls are configured to overlap the fourth, fifth, and sixth walls such that at least a portion of the third wall extends into the channel.

According to this disclosure, the formliner further includes one or more of the following: the first wall is configured to overlap the sixth wall; the second wall is configured to overlap the fifth wall; the third wall is configured to overlap the fourth wall; an extent of the first wall is less than an extent of the sixth wall; an extent of the third wall is less than an extent of the fourth wall; an extent of the fourth wall is less than an extent of the sixth wall; an extent of the fifth wall is less than an extent of the second wall; at least a part of the third wall is configured to extend into a groove when the first, second, and third walls overlap the fourth, fifth, and sixth walls; walls of the rib system form one or more polygonal shapes; further comprising a plurality of cells, wherein the rib system comprises a plurality of ribs, and wherein the plurality of ribs are disposed between the plurality of cells to form a plurality of boundaries of the plurality of cells; the channel extends through at least two cells of the plurality of cells; the at least a portion of the third wall extends along the at least two cells of the plurality of cells in the channel when the first, second, and third walls overlap the fourth, fifth, and sixth walls; the third wall comprises at least one opening, and wherein at least one rib of the plurality of ribs extends through the opening when the first, second, and third walls overlap the fourth, fifth, and sixth walls; at least some of the plurality of cells define a generally rectangular shape; at least some of the plurality of cells are of different sizes; the plurality of cells comprise opposing ends, the plurality of cells being arranged in a plurality of rows with each row having at least two cells disposed end-to-end; cells of a first row of the plurality of rows are offset from cells of a second row of the plurality of rows; the formliner comprises a first end and a second end, the first end being formed to include a first finger joint pattern and the second end being formed to include a second finger joint pattern that is complementary to the first finger joint pattern, wherein the first end is configured to be overlaid with the second end; the base comprises a textured pattern bounded by the rib system, wherein placing the curable material against the base and the rib system forms a textured surface in an exposed surface of the curable material where a contact surface comprising the textured pattern directly contacts the exposed surface of the curable material; the textured pattern comprises at least one of brick, wood, rock, stone, faux stone, cut stone, sand stone, ledgestone, fieldstone, castle rock, river rock, or slate; the textured pattern connects with the first wall; and/or the first wall, the second wall, and the third wall are configured to face the curable material in use when the first, second, and third walls overlap the fourth, fifth, and sixth walls.

According to this disclosure, a method for assembling formliners includes one or more of the following: connecting a first formliner with a second formliner by overlaying at least a portion of an overlapping section of a rib of the second formliner onto at least a potion of an overlapped section of a rib of the first formliner, the overlapping section of the rib of the second formliner configured to face curable material; and/or while connecting the first formliner with the second formliner, positioning at least a potion of a first rib edge of the overlapping section of the rib of the second formliner into a groove of the first formliner, the groove of the first formliner extending between the rib of the first formliner and a cell of the first formliner, the cell of the first formliner configured to face curable material in use and comprising a decorative pattern to be created in the curable material. The decorative pattern comprises a varying depth, the groove extending into the cell at least an extent of the varying depth of the decorative pattern proximate to the rib of the first formliner.

According to this disclosure, the method further includes one or more of the following: the first rib edge extends into the groove substantially the extent of the varying depth of the decorative pattern; positing a second rib edge of the rib of the first formliner against a support surface to provide structural support to the overlapped section of the first formliner and the overlapping section of the second formliner; placing the curable material against exterior surfaces of the first and second formliners to create the decorative pattern in the curable material; while connecting the first formliner with the second formliner, further comprising overlaying an opening of the overlapping section of the rib of the second formliner onto the at least a portion of the overlapped section of the rib of the first formliner; positioning the opening of the overlapping section of the rib of the second formliner adjacent to a transition zone of the rib of the first formliner, the transition zone having a varying profile that connects the overlapped section of the rib of the first formliner with a non-overlap section of the rib of the first formliner, wherein the non-overlap section of the rib of the first formliner is not overlapped by the overlapping section of the rib of the second formliner; while connecting the first formliner with the second formliner, further comprising positioning a part of the rib of the second formliner over a cutout in the overlapped section or the overlapping section of the rib of the first formliner such that the part of the rib of the second formliner does not overlap the rib of the first formliner; connecting the first and second formliners with at least one other formliner by overlaying at least a portion of an overlapping section of a rib of the at least one other formliner onto at least an other portion of the overlapped section of the rib of the first formliner; while connecting the first, second, and at least one other formliners, positioning at least a portion of a first rib edge of the overlapping section of the rib of the at least one other formliner into the groove of the first formliner; connecting the first, second, and at least one other formliners with a fourth formliner by overlaying at least a portion of an overlapping section of a rib of the fourth formliner onto at least a further other portion of the overlapped section of the first formliner; while connecting the first, second, at least one other, and fourth formliners, positioning at least a portion of a first rib edge of the overlapping section of the rib of the fourth formliner into the groove of the first formliner; while connecting the first, second, at least one other, and fourth formliners, positioning at least an other portion of the first rib edge of the overlapping section of the rib of the fourth formliner into a groove of the second formliner, the groove of the second formliner extending between the rib of the second formliner and a cell of the second formliner, the cell of the second formliner configured to face the curable material and comprising the decorative pattern to be created in the curable material; while connecting the first, second, at least one other, and fourth formliners, positioning at least a further portion of the first rib edge of the overlapping section of the rib of the fourth formliner into a groove of the at least one other formliner, the groove of the at least one other formliner extending between the rib of the at least one other formliner and a cell of the at least one other formliner, the cell of the at least one other formliner configured to face the curable material and comprising the decorative pattern to be created in the curable material; and/or while connecting the first, second, at least one other, and fourth formliners, positioning a part of the overlapping section of the rib of the fourth formliner onto a cutout in the overlapping section or the overlapped section of the rib of the at least one other formliner such that the part of the overlapping section of the rib of the fourth formliner directly faces the overlapped section of the first formliner.

A method is also provided for transferring a decorative pattern to an exposed surface of concrete and/or other curable material. The method comprises providing a plurality of formliners, each formliner comprising one or more shaped regions being bounded by ridges, each formliner defining overlapped ridges and overlapping ridges. The method can comprise engaging a first formliner with a second formliner by overlaying overlapping ridges of the second formliner onto overlapped ridges of the first formliner. For example, the method can include abutting an opening formed in the overlapping ridge of the second formliner with a transition zone formed in the first formliner, the transition zone being formed between the overlapped ridge and a non-overlap ridge of the first formliner. The method can also include placing an edge or end of an overlapping ridge into a groove or channel formed in a shaped region or cell when the overlapping ridge is placed over or onto the overlapped ridge. The method can also comprise placing the curable material against the first and second formliners, for example, to transmit a decorative pattern formed by the shaped regions of the first and second formliners to the curable material.

A formliner can include non-overlap or non-overlapping ridges and at least one opening formed in the overlapping ridges. Thus, the method can further comprise overlaying the overlapping ridges of the second formliner onto the overlapped ridges of the first formliner with a non-overlap ridge of the first formliner extending from an opening of the overlapping ridges of the second formliner. The non-overlap ridge of the first formliner can be interconnected with and extend from the overlapped ridge of the first formliner.

The non-overlap ridge of the first formliner can be separated from the overlapped ridge of the first formliner by a transition zone formed in the second formliner, and the method further comprises abutting the opening of the first formliner with the transition zone of the second formliner. The overlapping ridge and the non-overlap ridge can have generally the same exterior cross-sectional profile such that the exterior surfaces of the overlapping ridge and the non-overlap ridge are substantially flush when the first and second formliners are assembled. The opening can be formed as an open end of the overlapping ridge of the second formliner.

The overlapping ridges of the second formliner can define an interior cross-sectional profile that is greater than an exterior cross-sectional profile of the overlapped ridges of the first formliner. The method can comprise engaging a third formliner with the first formliner and the second formliner. The third formliner can comprise overlapping ridges and overlapped ridges. At least one of the first, second, or third formliners can comprise a sub-overlapped ridge section that defines an exterior cross-sectional profile that is less than an interior cross-sectional profile of the overlapped ridges.

For example, the sub-overlapped ridge section can be formed along a corner of a boundary of the at least one of the first, second, or third formliners. The method can comprise overlaying an overlapped ridge onto the sub-overlapped ridge section. Thus, the least one of the first, second, or third formliners can comprise the sub-overlapped ridge section formed along a corner of a boundary of the least one of the first, second, or third formliners, and the other formliners of the first, second, or third formliners can overlap the least one of the first, second, or third formliners at the sub-overlapped ridge section.

The formliners can include at least one row with a projecting cell bordered in at least one adjacent row with a non-projecting cell, and the method can comprise engaging the first formliner and the second formliner with a projecting cell in a first row of the first formliner being positioned adjacent to a non-projecting cell in a first row of the second formliner and a projecting cell in a second row of the second formliner being positioned adjacent to a non-projecting cell in a second row of the first formliner.

The method can further include interconnecting a first formliner with a second formliner by overlaying a first section of a rib of the second formliner onto a second section of a rib of the first formliner such that the second section of the rib of the first formliner is nested within a recess of the first section of the rib of the second formliner; and positioning an exterior surface of the first section of the rib of the second formliner flush with an exterior surface of a first section of the rib of the first formliner upon nesting of the second section of the first formliner within the first section of the second formliner.

The method can further include interconnecting another formliner with the first and second formliners by overlaying at least one of the first section of the rib of the first formliner or a first section of the rib of the second formliner onto a second section of a rib of the other formliner. Further, the method can comprise positioning an exterior surface of a first section of the rib of the other formliner flush with the exterior surface of the first section of the rib of one of the first or second formliner.

The method can include interconnecting a third formliner with the first and second formliners by overlaying a first section of the third formliner onto at least one of the second section of the rib of the first formliner or a second section of the rib of the second formliner. The method can further comprise interconnecting a fourth formliner with the first, second, and third formliners by overlaying a first section of the fourth formliner onto at least one of the second section of the rib of the first formliner, a second section of the rib of the second formliner, or a second section of the rib of the third formliner. The method can comprise positioning an exterior surface of a first section of the rib of the fourth formliner flush with the exterior surface of the first section of the rib of one of the first, second, or third formliner.

Additionally, the method can include mating an opening in the first section of the first formliner against a transition zone of the second formliner such that visible seams in the decorative pattern are minimized when the first formliner and the second formliner are interconnected in use. The transition zone can be formed between the first and second sections of the rib of the second formliner. Further, the opening can be formed as an open end of the first section of the first formliner.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

Non-limiting and non-exhaustive features will be described with reference to the following figures, wherein like reference numerals refer to like parts throughout the various figures, unless otherwise specified.

FIG. 12 is a cross-section view of a portion of the formliner of FIGS. 1-2 as taken along the line 12-12 as indicated in FIG. 5.

FIG. 13 is a cross-section view of a portion of the formliner of FIGS. 1-2 as taken along the line 13-13 as indicated in FIG. 6.

FIG. 18 is a cross-section view of a portion of the assembly of FIG. 14 as taken along the line 18-18 as indicated in FIG. 14.

FIG. 19 is a cross-section view of a portion of an other assembly as taken along the line 18-18 as indicated in FIG. 14.

DETAILED DESCRIPTION

Figure 1:
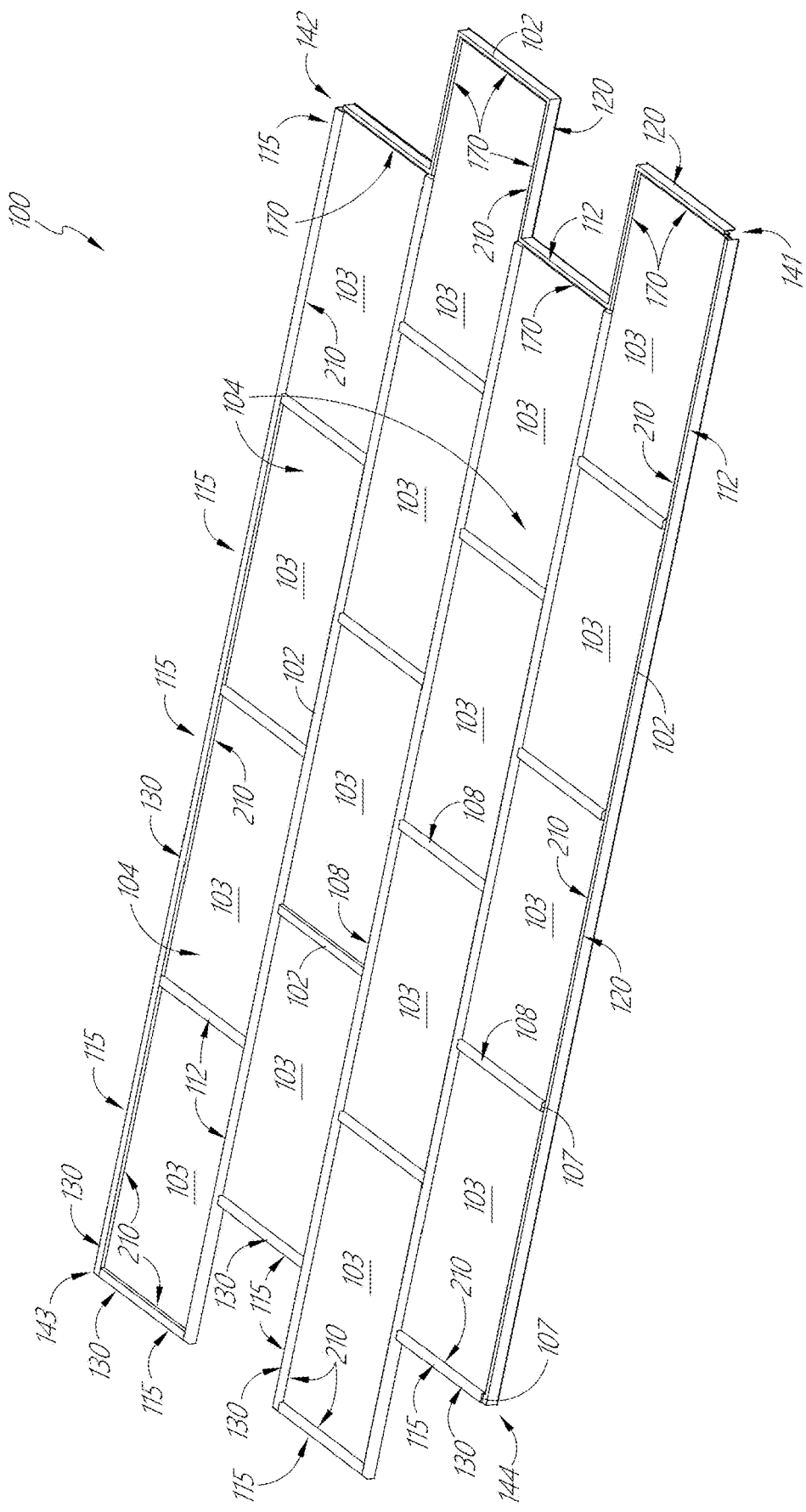
FIGS. 1-2 are top perspective views of a formliner.

While the present description sets forth specific details of various features, it will be appreciated that the description is illustrative only and should not be construed in any way as limiting. Furthermore, various applications of such features and modifications thereto, which may occur to those who are skilled in the art, are also encompassed by the general concepts described herein.

As generally discussed above, formliners of the present inventions are advantageously configured in order to enhance the aesthetic finish of a concrete or other curable material structure. In particular, formliners disclosed herein can be used to create a natural, seamless appearance of brick, stone, and other types of materials in a concrete or other curable material structure.

In contrast to prior art formliners that produce an inferior quality product, the structures of the formliner disclosed herein, which can also be referred to as a panel or sheet, allow the formliner to create decorative patterns that are visually superior to results provided through the prior art. These significant advantages are due at least in part to the nesting arrangement of the variable size channels of the formliner disclosed herein such as, for example, various parts of the formliner having corresponding features or parts that can mate, connect, or overlay with each other to form a desired formliner assembly. In particular, the formliner can comprise one or more relatively larger interconnection sections and one or more relatively smaller interconnection sections such that a plurality of formliners can be interconnected at their respective large and small interconnection sections. When interconnected, the plurality of formliners can define one or more generally continuous dimensions or shapes of raised portions thereof. For example, the large and small interconnection sections can be configured as nesting semi-cylinders or semi-polygons (e.g., polygons not closed on one or more sides) that form a rib structure. Additional advantages and features of the formliner are discussed further below.

It is contemplated that the formliner can be attached to another formliner and/or a form work by means of an adhesive. The adhesive can be disposed on a rear surface or back of the formliner and/or onto a front surface of the formliner. For example, the adhesive can be disposed on the front surface along a rib or ridge that will be overlaid by a portion of another formliner. The adhesive can be applied to butt-ends of formliners (e.g., sections that do not overlap as discussed herein).

The adhesive can be applied to the formliner at the site. For example, the adhesive can be applied or sprayed onto the formliner. The formliner can comprise an adhesive that can be activated or exposed in order to enable adhesive attachment of the formliner to another formliner or to a form work. The adhesive can be pre-applied to the formliner and can be exposed by removing a cover strip or activated by dampening with a liquid such as water or otherwise. As such, by peeling away a cover strip or by providing moisture to the adhesive, the adhesive can be activated to adhesively attach the formliner to another formliner or to a form work. As noted above in this manner, the formliner can be securely attached, engaged, mated, or connected to another formliner in a pattern and/or to a form work to facilitate handling and placement of the formliner.

The formliner and formliner components disclosed herein can be manufactured using any of a variety of processes. For example, it is contemplated that some formliners can be formed using a sheet and a vacuum forming operation. Other manufacturing processes such as injection molding, stamping, extrusion, etc. can also be used. The formliner or formliner components can be cut and shaped using any suitable method, including shear and/or laser cutting processes.

Figure 2:
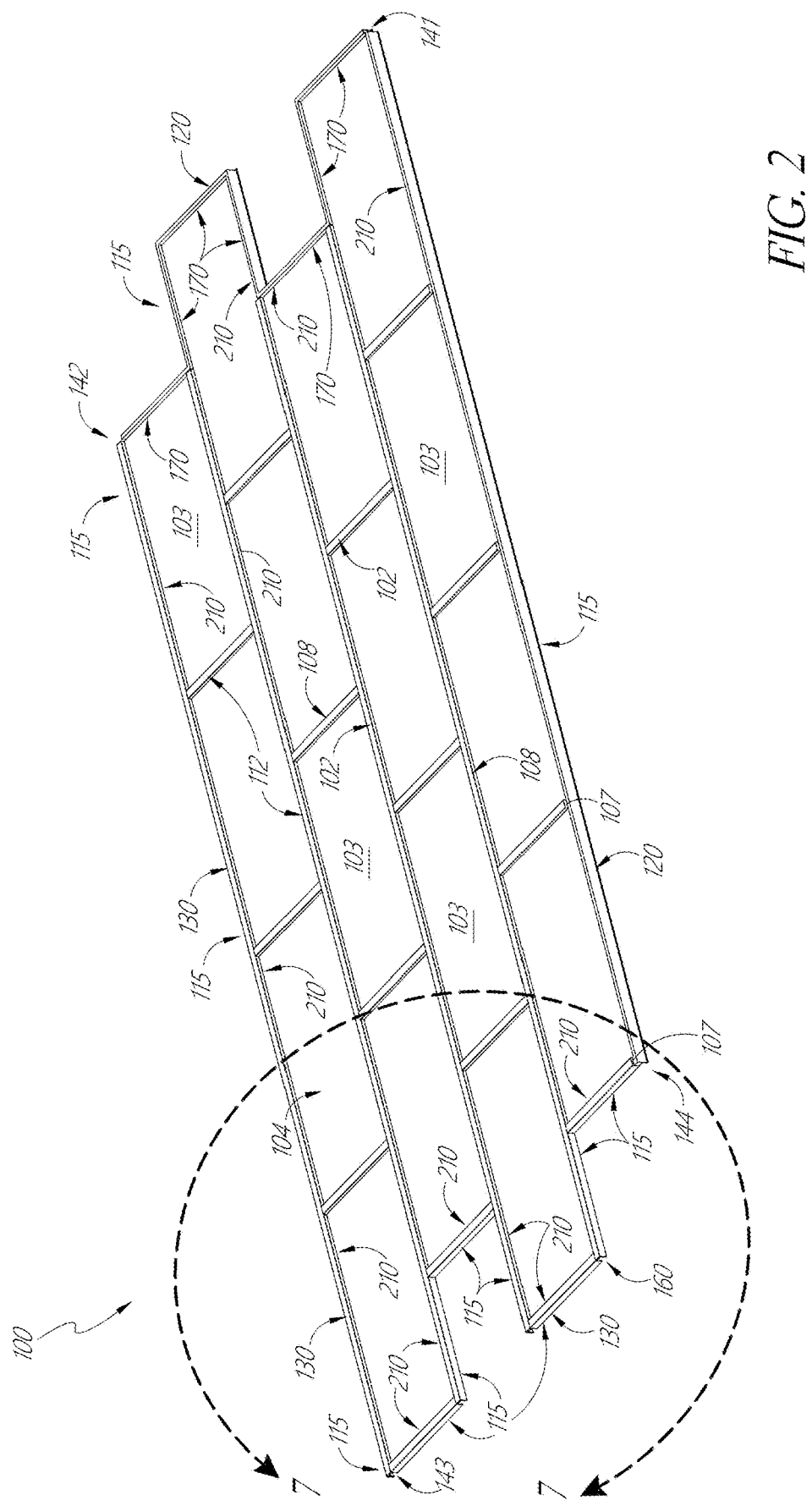

FIG. 1 is a top perspective view of a panel, sheet, or formliner 100 from one side of the formliner 100, while FIG. 2 is a top perspective view of the formliner 100 from the opposite side of the formliner 100. Referring to FIGS. 1 and 2, the formliner 100 can comprise a plurality of channels, ridges, or ribs 102. The ribs 102 can be a raised portion of the formliner 100. The ribs 102 can define an outer perimeter of the formliner 100. Additionally, the ribs 102 can extend inwardly to form one or more recesses or cells 104.

The cells 104 can comprise a recessed portion of the formliner 100. The recessed portion of the cell 104 can be configured to receive a curable material to which a pattern of the formliner can be conferred or transferred. The cells 104 can be uniformly sized. For example, the cells 104 can be rectangularly shaped. As discussed below, the formliner 100 can implement other shapes, depths, and sizes of the cells 104.

As shown, the cells or recesses 104 can be arranged in rows or layers. As will be discussed further below, the cells or recesses 104 of a given row can be offset with respect to cells or recesses of an adjacent or neighboring row. In this regard, a plurality of formliners 100 can be interconnected along ends thereof in such a way as to reduce any visible appearance of a seam between interconnected formliners. The offset configuration of the cells or recesses 104 can aid in concealing or hiding any seaming between formliners as well as provide a corresponding assembly joints for the formliners that conform to a desired pattern (e.g., rectangular cells 104).

Additionally, the cells 104 of adjacent rows can be offset from each other such that at opposing ends of the formliner 100, some of the cells 104 protrude at the end. In this regard, the rows can be formed to include projecting and non-projecting cells 104. The projecting cells can be considered to be complete or whole cells. In other words, the projecting cells may not be smaller in size than other cells 104 of the pattern even though the offset configuration of the cells 104 causes the projecting cells to protrude at one side or end of the formliner 100. As will be discussed further below, the projecting cells of the pattern can be interconnected with projecting cells of another formliner.

The formliner 100 can be used to create a faux brick and/or masonry pattern on a concrete structure. The formliner 100 can define a panel boundary 115 bounding the plurality of cells 104 by a plurality of sides. The top side of the formliner 100 may be positioned such that it can be pressed into fresh concrete. This can be accomplished by placing the formliner 100 against an exposed surface of fresh concrete. Otherwise, this can be accomplished by affixing a lower surface of the formliner 100 to an interior wall of a pattern, casting, or formwork (e.g., framework) before concrete is poured into the pattern, casting, or formwork. In either case, a material, such as concrete can be placed against the decorative pattern of the formliner 100 defined by the ribs 102 and the cells 104 in order to transfer the decorative pattern to the exposed surface of the material as the material cures.

The formliner 100 may include one or more ribs 102 that together form a rib system or network. The ribs 102 may be connected to or otherwise coupled with, and extend or project away from, one or more base segments or base 103 (e.g., web, contact surface, plane, base plane) of, for example, a cell 104. The base 103 may be generally flat or planar with the ribs 102 projecting from a side of the base 103. The ribs 102 connecting with the base 103 may form perimeters or peripheries 210 of the cells 104 (e.g., inside a cell 104) as discussed herein and in particular, in reference to FIG. 11. The base 103 can have an extent along the cell 104. For example, the extent of the base 103 may be substantially perpendicular to the walls of the ribs 102 as discussed herein. The extent of the base 103 may be along a longitudinal dimension of the base 103. For example, the extent of the base 103 may be the length between two peripheries 210 illustrated in FIG. 11.

The base 103 can have a desired textured pattern as discussed herein. The ribs 102 form a rib system 112 of the formliner 100. The rib system 112 and the base 103 can define or form a cell 104. There may be one or more cells 104. As shown, there are sixteen cells 104. However, there may be fewer or more cells 104. The cells 104 can be of the same, similar, and/or different size or dimensions. The cells 104 may be spaces into which a curable material, such as concrete, may be poured. It is understood that not every instance of a feature of the formliner is labeled in the various figures. For example, only some of the cells 104 are labeled in FIGS. 1-2, however it is understood that there are other cells 104 as illustrated that, for purposes of clarity, are not labeled. Similarly, only some of the ribs 102 are labeled in FIGS. 1-2 for clarity. This may be true for other features of the formliner in this or other figures where fewer than all of those features shown in the respective figures are labeled with callouts.

The ribs 102 may have varying shapes, sizes and configurations. As shown, the ribs 102 extend along and form a boundary 115 of the formliner 100 as well as a boundary 115 for the cells 104. The boundary 115 may be located generally on the sides of the formliner 100. The ribs 102 that form the boundary 115 may include one or more overlapped sections 120 (e.g., second sections) and one or more overlapping sections (e.g., first sections) 130. As shown, the overlapped section 120 extends along two adjacent portions of the boundary 115, while the overlapping section 130 extends along the two other adjacent portions of the boundary 115, as further described below. The overlapped sections 120 and the overlapping sections 130 may have various configurations as discussed in further detail herein, for example with respect to FIGS. 16-19. As is further discussed, the configurations of the sections 120, 130 may allow for a first formliner 100 to meet or otherwise couple with complementary portions of a second formliner 100. Further detail of the coupling of multiple formliners together is discussed herein, for example with respect to FIGS. 14-22.

The formliner 100 may have corners. As shown, the formliner may have a first corner 141, a second corner 142, a third corner 143 and a fourth corner 144. The four corners 141, 142, 143, 144 may also be located at or along the boundary 115 of the formliner. The four corners 141, 142, 143, 144 may be located at the ends of respective overlapped sections 120 and/or overlapping sections 130. As shown, the overlapped section 120 may extend along and form the boundary 115 from the first corner 141 to the second corner 142. As further shown, the overlapped section 120 may extend along and form the boundary 115 from the first corner 141 to the fourth corner 144. Correspondingly, the overlapping section 130 may extend along and form the boundary 115 from the third corner 143 to the fourth corner 144. As further shown, the overlapping section 130 may extend along and form the boundary 115 from the third corner 143 to the fourth corner 144.

The boundary 115 and the various sections or portions thereof may extend in a variety of directions and have a variety of contours. As shown, the overlapping section 130 extending from the third corner 143 to the fourth corner 144 may be in a first fingerjoint pattern. Similarly, the overlapped section 120 extending from the first corner 141 to the second corner 142 may be in a second (corresponding) fingerjoint pattern as shown that is opposite from and complementary to the first fingerjoint pattern. The complementary boundary portions, whether fingerjoint or other patterns or contours, may allow two or more formliners to be substantially seamlessly assembled together. The boundary 115 may also be straight. As shown, the overlapping section 130 may extend from the second corner 142 to the third corner 143 in a generally straight or unbent fashion without any turns, bends, or corners. The overlapped section 120 may extend from the fourth corner 144 to the first corner 141 in a similarly straight manner as shown.

The various corners 141, 142, 143, 144 of the formliner 100 may be locations where the various sections intersect or are otherwise adjacent to each other. As shown, the first corner 141 may be a location where the overlapping section 130 intersects with or otherwise approaches the overlapped section 120. The second corner 142 and/or fourth corner 144 may be at a location where the overlapped section 120 intersects with or otherwise approaches the overlapping section 130. The third corner 143 may be at a location where one overlapping section 130 intersects with or otherwise approaches another overlapping section 130.

The ribs 102 extending along and forming the boundary 115 of the formliner 100 may therefore include the overlapped or overlapping sections 120, 130. However, the ribs 102 along the boundary 115 need not include entirely either an overlapped section 120 or an overlapping section 130. The ribs 102 forming the boundary 115 may include discontinuities therealong. Thus, the formliner shown in FIGS. 1-2 is merely one configuration that is possible, and other suitable configurations are within the scope of this disclosure.

The ribs 102 may also include one or more internal sections 108 (e.g., internal ribs, non-overlap ribs). As shown, the internal sections 108 may be portions or segments of the ribs 102 other than those portions along the boundary 115 of the formliner 100. The internal sections 108 may be portions of the ribs 102 that extend or project farther from the base 103 than other portions of the ribs 102. For example, the internal sections 108 may project farther from the base 103 than the overlapped sections 120. Further, the overlapping sections 130 may be at a similar height as the internal sections 108. For example, as shown the internal sections 108 may extend to and interface with the overlapping sections 130. Portions of the internal section 108 and portions of the overlapping sections 130 may thus be at the same height or have the same length from the base 103. Portions of the internal section 108 and portions of the overlapping sections 130 may thus be at the same height relative to the base 103. Further detail of the heights and cross-sections of the various sections 108, 120, 130 of the ribs 102 are discussed herein, for example with respect to FIGS. 10-13.

The cells 104 may have a perimeter or periphery formed by various portions or sections of the ribs 102 (e.g., connections or connecting areas/points between the ribs 102 and the cells 104). The perimeter of the cells 104 may include as shown the internal section 108, the overlapped section 120, and/or the overlapping section 130. Further, the perimeter of the cells 104 may include one or more sides that extend along the boundary 115. For example, the cell 104 adjacent to the third corner 143 includes a perimeter with three sides along the boundary 115. Similarly, the cell 104 adjacent to the first corner 141 includes a perimeter with three sides along the boundary 115. The cell 104 adjacent to the second corner 142 includes a perimeter with two sides along the boundary 115, which may include as shown part of the overlapped section 120 and part of the overlapping section 130. Similarly, as shown the cell 104 adjacent to the fourth corner 144 may have a perimeter with two sides along the boundary and part of a third side along the boundary 115, which may include as shown portions of the overlapped section 120.

The cells 104 may therefore be formed by various portions or sections of the ribs 102 and the base 103. For example, some of the cells 104 may be formed by the overlapped section 120 and the internal section 108 of the ribs 102. Further, as shown some of the cells 104 may be formed entirely by the internal sections 108 of the ribs 102. Further, the cells 104 may be formed by the overlapping sections 130 and the internal sections 108 of the ribs 102. Therefore, various portions and sections of the ribs 102 along with the base 103 may form the cells 104.

The cells 104 may also have various shapes and sizes. As shown, the cells 104 may be generally rectangular in shape and of same sizes. Some of the cells 104 may have the various or different sizes and/or shapes. Further, other shapes besides rectangular may be implemented, such as square, triangular, polygonal, rounded, other shapes, and/or combinations thereof. Thus, the configuration shown of the cells 104 is merely one example and many other suitable configurations are possible.

The formliner 100 may include one or more transition zones 107. As shown, there may be seven transition zones 107. There may be fewer or more than seven transition zones 107, such as one, two, three, four, five, six, eight, nine, ten, fifteen, twenty, fifty, one hundred, or more. The transition zones 107 may be a portion or segment of one or more ribs 102 with transitions between various sections or portions of the ribs 102. For example, as shown the transition zones 107 may provide a transition between the overlapped sections 120 and the internal sections 108 of the ribs 102. Further, as shown the transition zones 107 may be located at or near the boundary 115 of the formliner 100. The transition zones 107 may be changes in height or other features of the various sections of the ribs 102, as discussed in further detail herein, for example with respect to FIG. 18.

Figure 3:
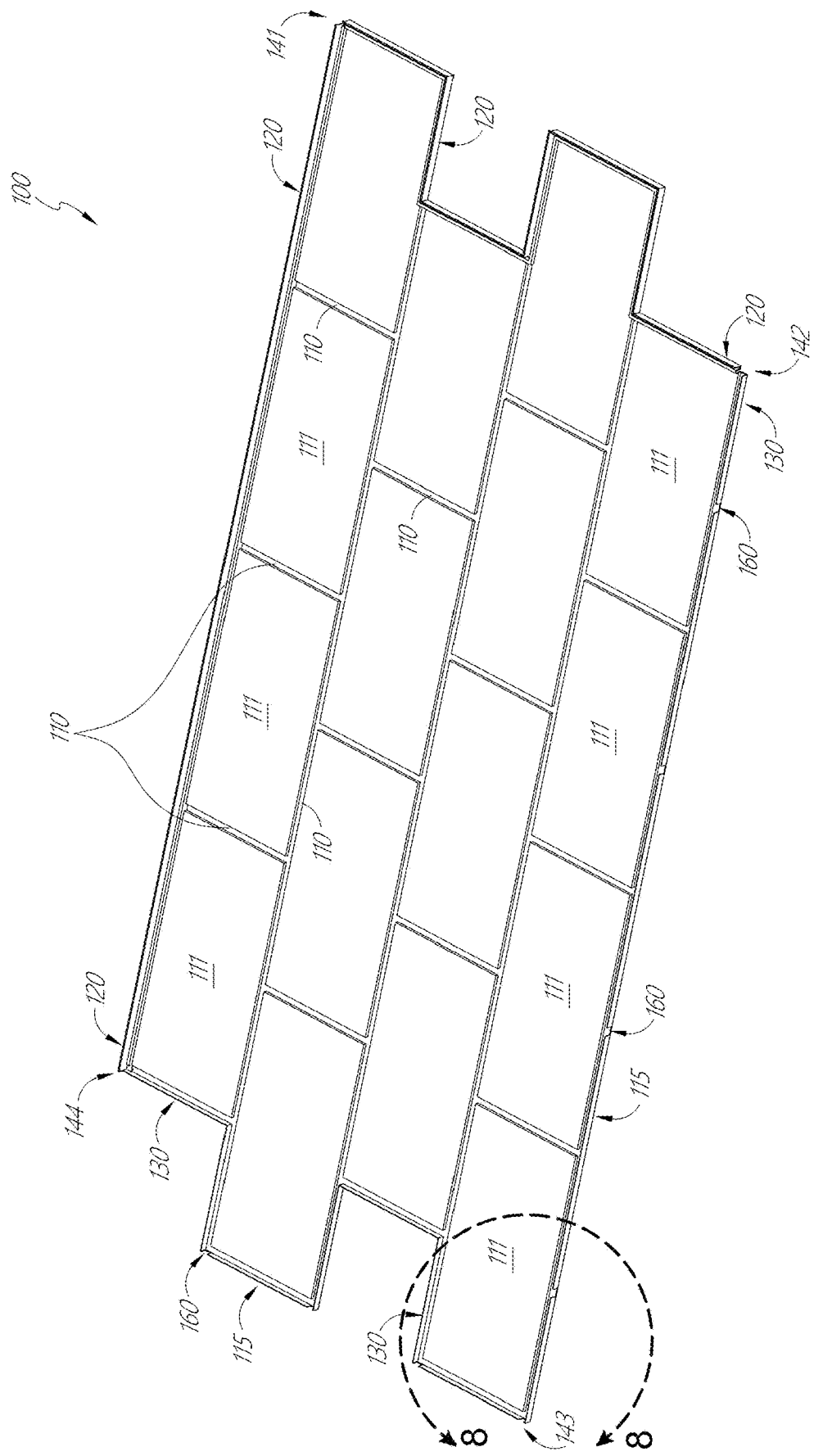
FIGS. 3-4 are bottom perspective views of the formliner of FIGS. 1-2.
Figure 4:
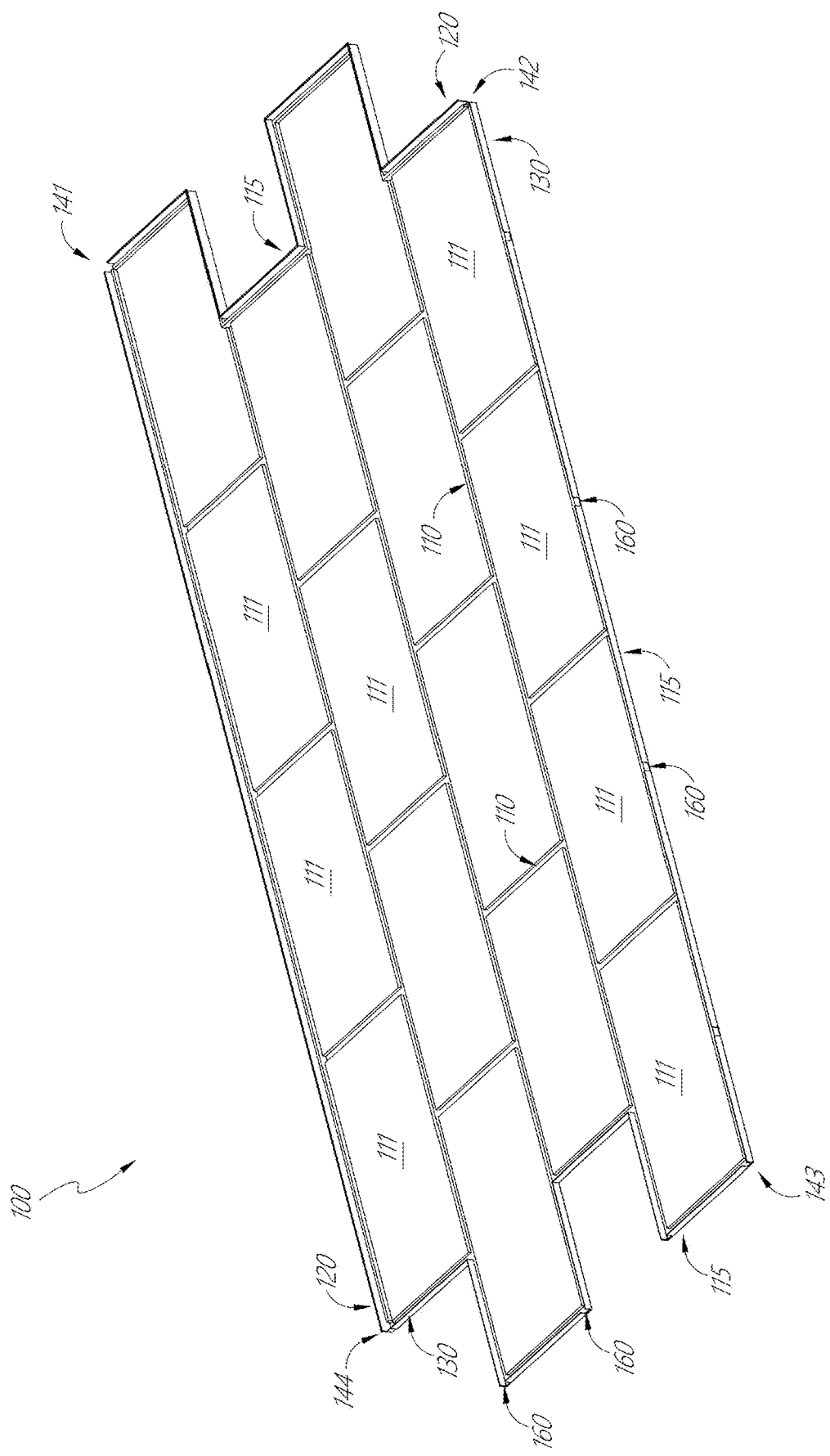

FIGS. 3-4 are bottom perspective views of the formliner 100. FIG. 3 is a bottom perspective view from one side of the formliner 100, and FIG. 4 is a bottom perspective view from the opposite side of the formliner 100. As shown, the bottom side of the formliner 100 may include one or more bottom surfaces 111 (e.g., web, base, etc.). The bottom surfaces 111 may be surfaces of the base 103 that are located opposite from the interior of the cell 104.

The bottom side of the formliner 100 may include one or more channels or conduits 110. The channels 110 may be spacings, which may be empty spaces or voids or may be filled with material, in between the various cells 104. As shown, the channels 110 may be empty spaces on the underside of the ribs 102. The channels 110 may be formed during the manufacturing process to form ribs 102. The channels 110 may be formed from a mold that is used to create the cells 104 of the formliner 100. The mold includes projections in the shape of the cells 104 where the projections are spaced so that the channels 110 form in the formliner 100 in between the cells when produced with the mold. While the channels 110 may be spaces in between the cells 104, the channels 110 may be filled with material. Therefore, the channels 110 may be solid portions of the formliner 100 in between the cells 104. The channels 110 may also be spaces or materials within the ribs 102. For example, the ribs 102 shown in FIGS. 1-2 may form the channels 110 on the underside (as oriented in FIGS. 1-2) of the ribs 102.

Figure 5:
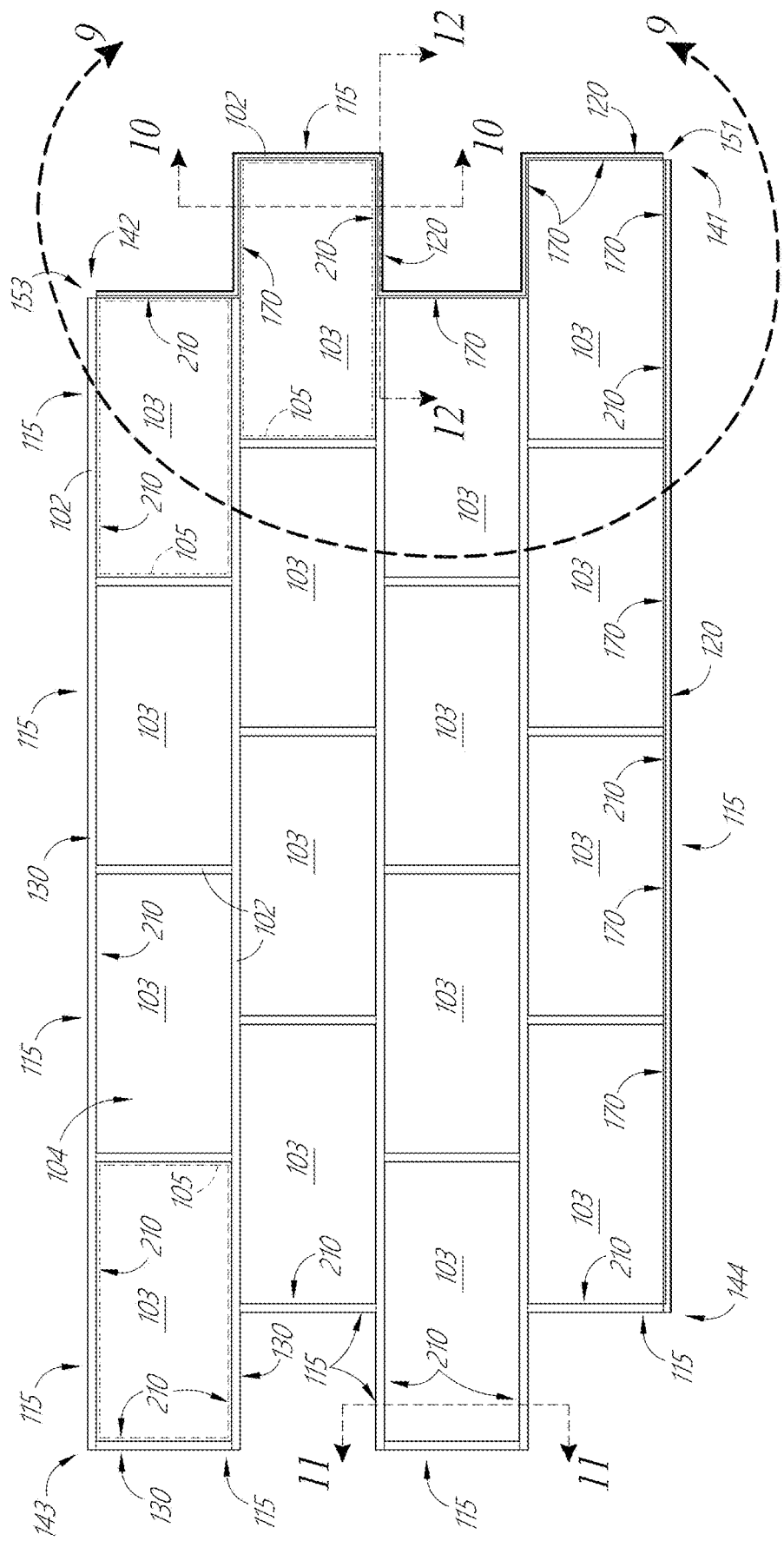
FIG. 5 is a top view of the formliner of FIGS. 1-2.

FIG. 5 is a top view of the formliner 100. As shown, the formliner may include various rows or layers of the cells 104 extending from left to right as oriented in the figure. The rows of the cells 104 may be aligned with each other or they may be unaligned. Further, the rows may be complete or incomplete. Therefore, various configurations of the cells 104 may be implemented.

As mentioned, the cells 104 may have a perimeter that is formed by various ribs 102. Further, the cells 104 may define or form a cell space or volume 105. As shown, the cell 104 adjacent to the second corner 142, or other cells, may include a cell volume 105 that extends to the surrounding four ribs 102 of the cell 104. In the cell 104 adjacent to the third corner 143, the cell volume 105 extends between three overlapping sections 130 of the ribs 102 and one internal section 108 of the ribs 102. The cell volume 105 is shown in dashed lines, indicating that it is merely a geometric reference and not a physical feature of the formliner 100. Further, the dashed lines are shown offset from the surrounding ribs 102 for purposes of clarity. It is understood that the cell volume 105 may extend to the inner surfaces of the surrounding ribs 102. The cell volume 105 may therefore have a depth, which is shown and explained in further detail herein, for example with respect to FIG. 10. Further, while a single cell 104 has been used to describe the cell volume 105, it is understood that any of the other cells 104 may also form or define other cell volumes 105.

Further shown in FIG. 5 is the boundary 115. As mentioned, the boundary 115 extends along the outer perimeter of the formliner 100. Further, the boundary 115 may have a variety of contours besides those shown and described elsewhere herein. For instance, in FIG. 5 the segment of the boundary 115 between the first corner 141 and the second corner 142 includes inner portions that are aligned with each other and outer portions that are aligned with each other. Similarly, the segment of the boundary 115 between the third corner 143 and the fourth corner 144 includes inner portions that are aligned with each other and outer portions that are aligned with each other. These two opposite segments of the boundary 115 are therefore complementary such that two of the formliners 100 may be coupled or paired together. Such assemblies are discussed in further detail herein, for example with respect to FIGS. 14-22.

For purposes of the present discussion, it is understood that other complementary configurations of opposite segments of the boundary 115 may be embodied. The portion of the boundary 115, going in the direction from the first corner 141 to the second corner 142, may be located progressively farther inward. Further, the inner portions of this segment of the boundary 115 need not be aligned with each other but may be offset or located progressively farther inward or outward, or combinations thereof, in the direction from the first corner 141 to the second corner 142. Similarly, the portion of the boundary 115 extending from the fourth corner 144 to the third corner 143 may have a different configuration than what is shown. In the direction from the fourth corner 144 to the third corner 143, this segment of the boundary 115 may include outer portions that are located progressively farther outward or inward. Similarly, this segment of the boundary 115 may include inner portions that are aligned or that are located progressively farther outward in a direction from the fourth corner 144 to the third corner 143. Therefore, a multitude of configurations may be implemented for the various segments of the boundary 115.

The formliner 100 may further include cutouts along the boundary 115. As shown in FIG. 5, the formliner 100 may have a first cutout 151 and a second cutout 153. The cutouts 151, 153 maybe located at the corners of the formliner 100. As shown, the first cutout 151 may be located at the first corner 141, and the second cutout 153 may be located at the second corner 142. This is merely one example, and there need not be two cutouts. There may be no cutouts. There may only be one cutout. For example, there may only be a single cutout 153 at the first corner 141, but no cutout at the second corner 142. The overlapped section 120 may be formed to extend further, transversely to the overlapping section 130 to replace the cutout 153 illustrated in FIG. 5. A transition zone from the overlapped section 120 to the overlapping section 130 may be positioned where the end of the overlapping section 130 is illustrated at cutout 153 in FIG. 5. The overlapping section 130 may be formed to extend further transversely to the overlapped section 120 to replace the cutout 153 illustrated in FIG. 5. A transition zone 107 from the overlapped section 120 to the overlapping section 130 may be provided, positioned, and/or formed where the end of the overlapped section 120 is illustrated at cutout 153 in FIG. 5.

There may be three or four cutouts. For example, there may be one or two additional cutouts besides what are shown in FIG. 5, such as a (third) cutout at the third corner 143 and/or a (fourth) cutout at the fourth corner 144. The various cutouts may be formed by interfaces of various portions of the boundary 115. For example as shown, the first cutout 153 may be formed by an interface of an overlapped section 120 and another overlapped section 120 at the first corner 141. As shown, the second cutout 153 may be formed by an interface of the overlapping section 130 and the overlapped section 120 at the second corner 142. Therefore, the cutouts may be formed on one side by the end of one portion of the boundary 115 and on the other side by the end of another portion of the boundary 115. For example, as shown the second cutout 153 at the second corner 142 is formed on one side by an end of the overlapping section 130 and on the other side by an end of the overlapped section 120. The first cutout 153 may be similarly formed at the second corner 142 by an end of the overlapped section 120 and on the other side by an end of the overlapped section 120. These are merely some examples of possible configurations for the cutouts and others that are suitable may be implemented.

Figure 6:
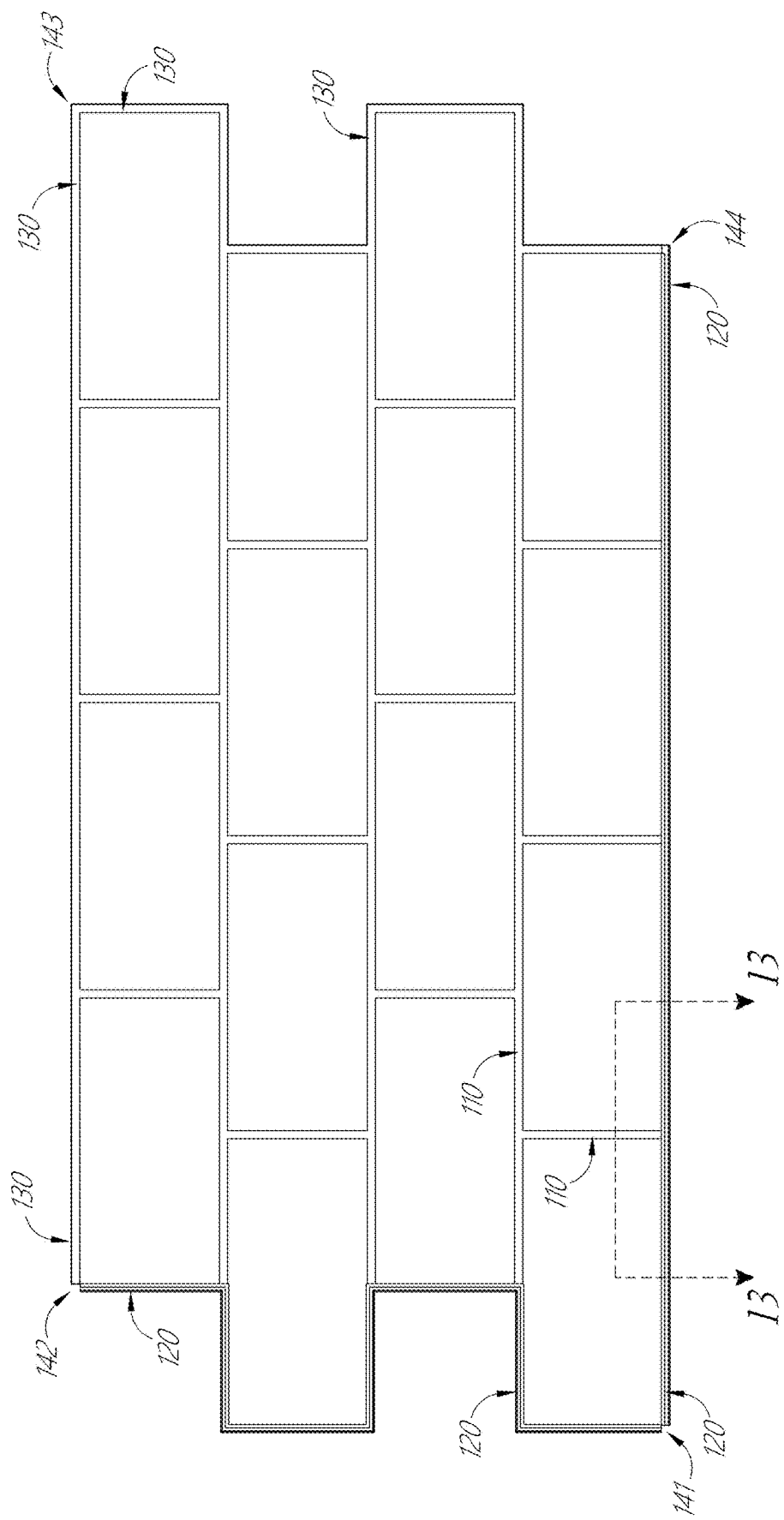
FIG. 6 is a bottom view of the formliner of FIGS. 1-2.

FIG. 6 is a bottom view of the formliner 100. As shown, the channels 110 may connect with each other and form a system or network of the channels 110 along the bottom of the formliner 100. The channels 110 may extend toward an interface with the overlapped sections 120 and/or the overlapping sections 130. As mentioned, the channels 110 may be features of the ribs 102. Thus, the channels 110 may have a layout that resembles the general layout of the ribs 102. It is understood that the configuration of the channels 110 as shown is merely one example and that other suitable configurations may be implemented.

Figure 7:
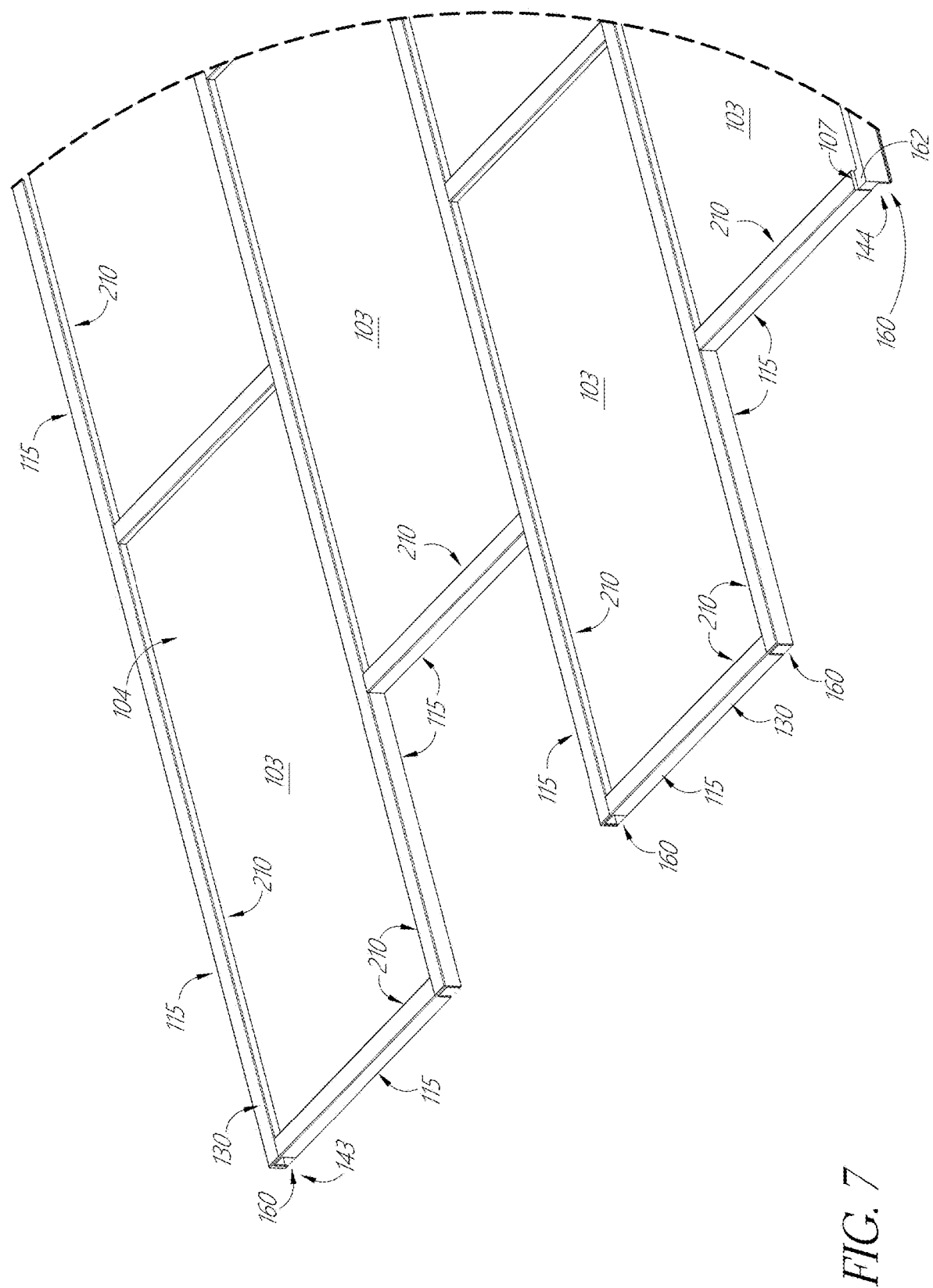
FIG. 7 is a detailed view of a portion of the formliner of FIGS. 1-2 along the line 7-7 as indicated in FIG. 2.
Figure 8:
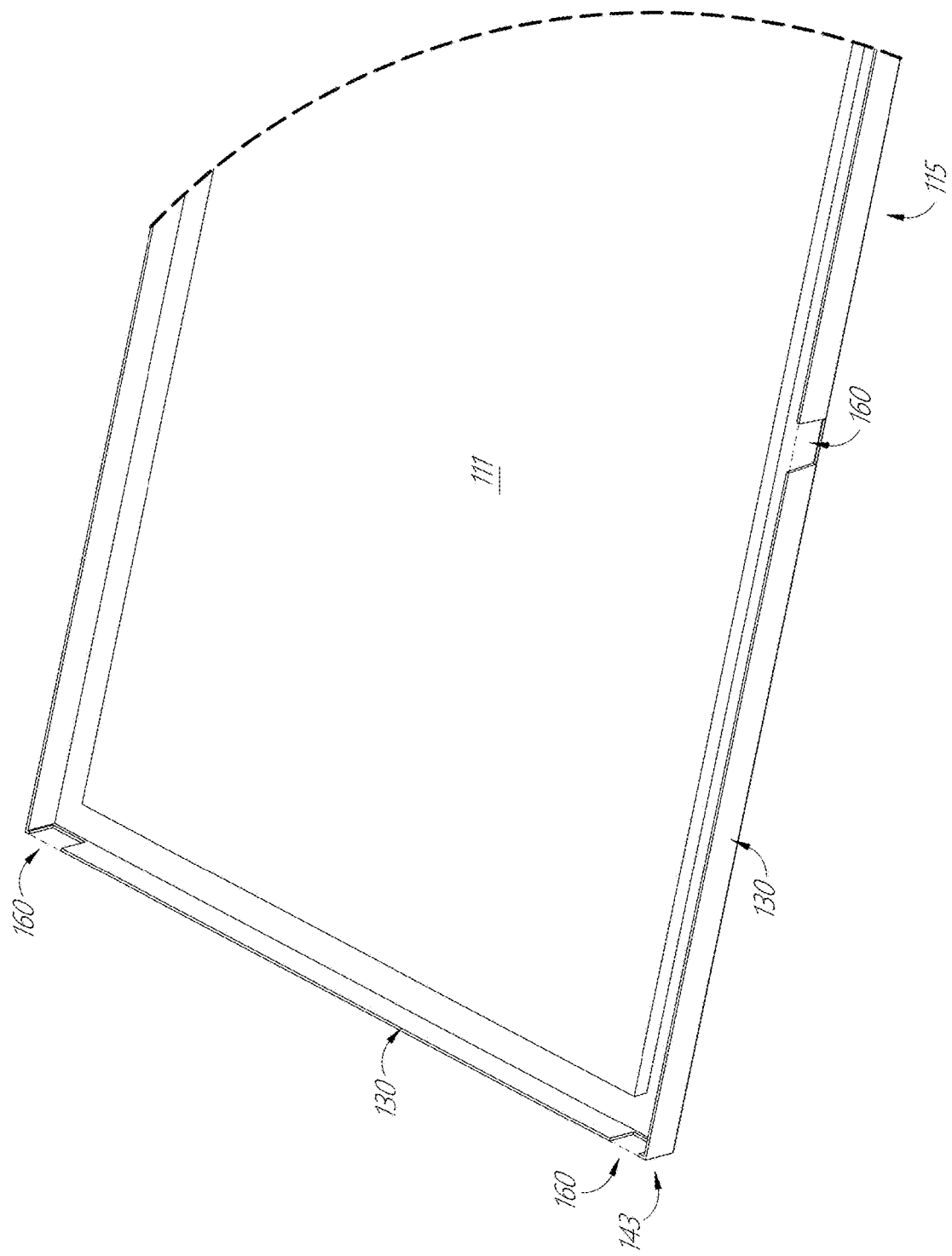
FIG. 8 is a detailed view of a portion of the formliner of FIGS. 1-2 along the line 8-8 as indicated in FIG. 3.
Figure 9:
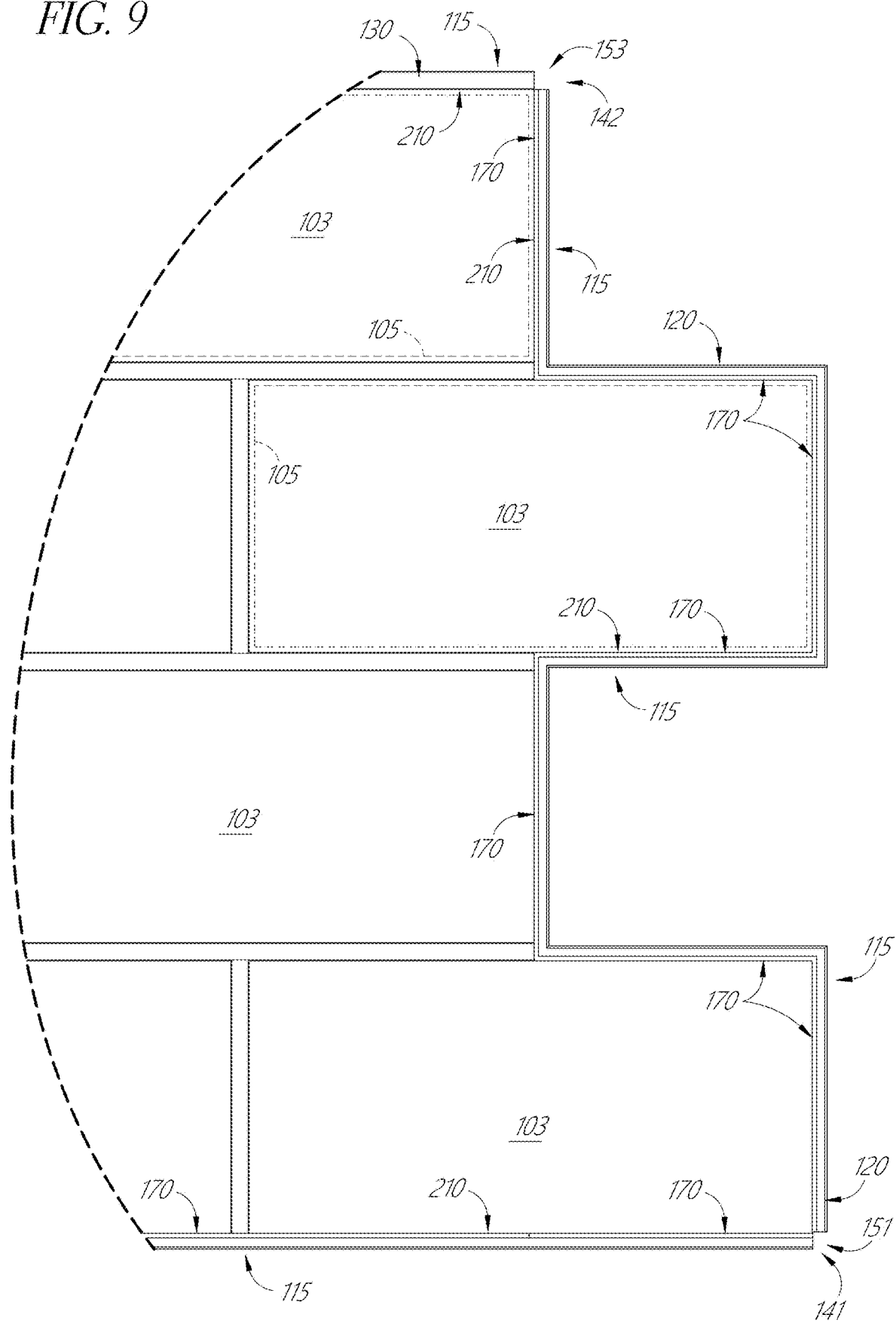
FIG. 9 is a detailed view of a portion of the formliner of FIGS. 1-2 along the line 9-9 as indicated in FIG. 5.

FIG. 7 is a detailed view of a portion of the formliner 100 along the line 7-7 as indicated in FIG. 2. FIG. 8 is a detailed view of a portion of the formliner 100 along the line 8-8 as indicated in FIG. 3. FIG. 9 is a detailed view of a portion of the formliner 100 along the line 9-9 as indicated in FIG. 5. As shown, the formliner 100 can have one or more rib openings 160 in the overlapping sections 130 of the formliner 100. The rib opening 160 can allow the overlapped sections 120 to pass therethrough, thus enabling the overlapping sections 130 to be overlaid onto the overlapped sections 120. The rib openings 160 can be dispersed throughout an extent of the overlapping sections 130 as illustrated in, for example, FIGS. 2-4. The rib openings 160 can allow overlapping with minimal, minimized, or substantially or relatively no visible seaming of connected/assembled formliners by allowing the overlapping portions of the formliners to fit tightly and closely against other portions of the formliner such as transition zones 107 and/or internal sections ribs 108. For example, the rib openings 160 can be sized and positioned to be overlaid and mate with protrusion 162 as discussed herein.

As illustrated in FIGS. 1, 2, 5, and 9, the formliner can have one or more channel(s), canal(s), conduit(s), slit(s), passage(s), vein(s), or groove(s) 170. The channel(s) 170 may be spacings in between the various cells 104. As shown, the channel(s) 170 may be empty space(s) between base 103 and the overlapped section 120 of the formliner 100. The channel(s) 170 may be formed during the manufacturing process. The channel(s) 170 may be formed from a mold that is used to create the cells 104 of the formliner 100. The mold includes indentations in the shape of the channel(s) 170 where the indentations are spaced so that the channel(s) 170 forms in the formliner 100 in between the cells 104 when produced with the mold. As discussed herein, the channel 170 may be sized and positioned to accept a rib edge 241 (FIG. 11) of an overlapping section 130 when formliners are interconnected.

As illustrated in FIGS. 1, 2, 5, and 9, the channel 170 can extend along the peripheries 210 of the base 103. The channel 170 can extend along the boundary of the formliner 100 substantially an extent of the overlapped sections 120 of the formliner 100. The channel 170 can extend between the first corner 141 and the second corner 142 along, for example, the boundary 115 of the formliner 100 between the first corner 141 and the second corner 142 and/or along peripheries 210 of the cells 104 between the first corner 141 and the second corner 142. As shown in FIG. 9 (and FIG. 5), the channel 170 can be substantially continuous (e.g., without breaks or unbroken) along the boundary 115 between the first corner 141 and the second corner 142. Further, as shown in FIG. 5, the channel 170 can be substantially continuous (e.g., without breaks or unbroken) along the boundary 115 between the first corner 141 and the fourth corner 144.

The channel 170 can extend between the first corner 141 and the fourth corner 144 along, for example, the boundary 115 of the formliner between the first corner 141 and the fourth corner 144 and/or along peripheries 210 of the cells 104 between the first corner 141 and the fourth corner 144. The channel 170 can be substantially continuous (e.g., without breaks) along boundary 115 between the first corner 141 and the fourth corner 144.

As shown in FIGS. 7 and 8 by dashed lines corresponding to or along the openings 160, the formliners 100 may be formed without some or all of the openings 160. For example, as discussed herein, a rib edge of the overlapping section 130 may extend into the channel 170 when the formliners are interconnected or assembled. A continuous rib edge (241, see FIG. 10) of the overlapping section(s) 130 without openings 160 may extend along and in a substantially continuous channel 170 between the first corner 141 and the second corner 142 and/or the first corner 141 and the fourth corner 144.

The channel 170 may have breaks, bumps, projections, or protrusions 162 corresponding to openings 160 in the formliner 100. The channel 170 may have breaks (e.g., protrusions 162) corresponding to ribs 102 (e.g., internal ribs 108) as discussed herein. The channel 170 may be not wholly continuous between the first corner 141 and the second corner 142 and/or the first corner and the fourth corner 144. For example, protrusions 162 may be positioned in the channel 170 corresponding to where the internal sections 108 of the ribs 102 extend or project into or toward the overlapped sections 120 with, for example, transition zones 107 connecting internal section 108 and the overlapped sections 120. Accordingly, the openings 160 may be positioned over or onto the protrusions 162 when the formliners are interconnected or assembled.

Figure 10:
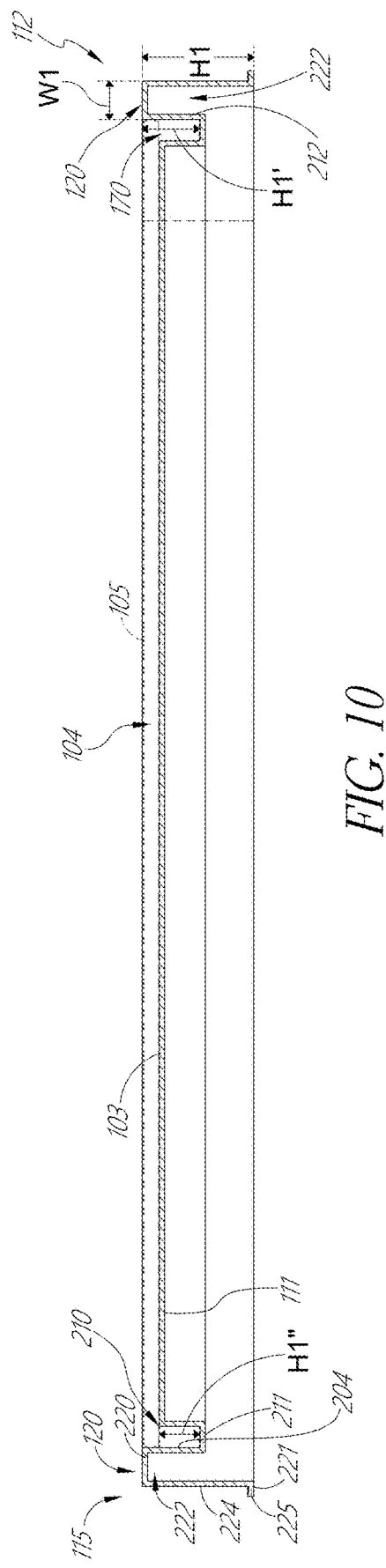
FIG. 10 is a cross-section view of a portion of the formliner of FIGS. 1-2 as taken along the line 10-10 as indicated in FIG. 5.

FIG. 10 is a cross-section view of a portion of the formliner 100 as taken along the line 10-10 as indicated in FIG. 5. As shown in FIG. 10, the cell 104 may be bounded on two sides by the boundary 115 (and/or perimeter 210 as discussed herein). On one side of the cell 104, the boundary 115 may include an overlapped section 120. The opposite side of the cell 104 may also include an overlapped section 120. It is understood that one or both of the portions of the boundary 115 shown in FIG. 10 may be overlapping sections 130, as discussed in further detail herein for example with respect to FIG. 11. It is further understood that the overlapped sections 120 and the overlapping sections 130 are sections or segments of the ribs 102. Therefore, the ribs 102 may have either an overlapped section 120 or they may be shaped like the overlapping section 130. Thus, the boundary 115 may include the ribs 102 as either the overlapped sections 120 and/or the overlapping sections 130.

Each of the sections 120, 130 may be formed from one or more walls or segments. As shown in FIG. 10, the formliner can include a channel 170 connected to the base 103. The channel 170 can accept and mate with a rib edge (241) as discussed herein and in particular, in reference to FIGS. 14-18. The channel 170 can extend toward a support surface (of a framework 602, see FIG. 22) discussed herein relative to the base 103. It is understood that while the base 103 is shown to be generally flat or planar in configuration, the base 103 can be formed to accommodate any desired pattern. For example, the base 103 can be formed to include a textured pattern (e.g., decorative pattern 402) having a masonry design or other designs as discussed herein. The design can have an amplitude as discussed herein that extends toward and/or contacts the support surface (of a framework 602, see FIG. 22).

As shown in FIG. 10, the overlapped section 120 may include a first wall 204. The first wall 204 may be connected to and extend away from the channel 170 (e.g., generally perpendicular to the base 103). The first wall 204 may be directly connected to channel 170. As shown, the first wall 204, the channel 170, and/or the base 103 may be integral such that they are formed from the same monolithic piece of material. The first wall 204 may be attached to channel 170 and/or the base 103 with various suitable mechanical attachments, such as nails, rivets, adhesive, tape, string, or other suitable means.

The first wall 204 may include a lower region or lower portion 212 (e.g., an inner portion 212 relative to the straight portion 208). The lower portion 212 of the first wall 204 may be on a side of the first wall 204 that is opposite the cell 104. The lower portion 212 may refer to an area or region of intersection of the first wall 204 and the base 103. The intersection of the base 103 and the lower portion 212 (and in particular, the angled portion 206 of the first wall 204) can form the perimeter or periphery of the cell 104 as discussed herein, such as, for example perimeter 210 in reference to FIGS. 2 and 11.

The lower portion 212 may be formed by the intersection of the first wall 204 and a bottom or exterior surface 211 of the channel 170. This intersection may be a sharp point as shown, or it may be rounded, other shapes, or combinations thereof. Further, the lower portion 212 may include more than just the point or intersection of the first wall 204 and the bottom surface 211. For instance, the lower portion 212 may extend along the first wall 204 for a distance toward a second wall 220 of the overlapped section 120. Therefore, the lower portion 212 can be the lowest area of the outside surface of the first wall 204, but may include other portions of the first wall 204 there above. The lower portion 212 may extend from the first end of the first wall 204 to a location halfway along the first wall 204. Thus, first wall 204 may have a length or height H1' (e.g., corresponding to depth H1" of the channel 170) approximately equal to half the length or height H1. The first wall 204 may have other suitable lengths H1' as discussed herein, such as about ¼, ⅓, ⅔, or ¾ the length of H1, including the foregoing values and ranges bordering therein. The length H1' may be the length from an exterior or top surface of the second wall 220 (e.g., surface of the second wall 220 configured to be overlapped by the overlapping section 130) and an interior surface of the channel 170 (e.g., surface configured to be adjacent or face the rib edge 241 of the overlapping section 130).

The overlapped section 120 may further include a second wall 220. The second wall 220 may be connected to the first wall 204. The first wall 204 may be connected to the base 103 and/or channel 170 on one end of the first wall 204 and on the opposite end may be connected to the second wall 220. As shown, the second wall 220 may connect with an end of the straight portion 208 of the first wall 204. The second wall 220 may be integral with the first wall 204 such that they are made from the same monolithic piece of material. The second wall 220 may be mechanically attached to the first wall 204 in a variety of manners, including those described above with respect to the first wall 204 and the base 103, as well as others.

As shown, the second wall 220 may extend generally outward or away from the cell 104 (e.g., generally parallel with the base 103). The direction of extension of the second wall 220 may be generally perpendicular to the general direction of extension of the first wall 204. The second wall 220 may also extend in any direction that is substantially parallel with the base 103. However, these are merely some examples and a variety of configurations of the second wall 220 may be implemented. The second wall 220 may not be generally perpendicular to the first wall 204 or generally parallel with the base 103. For instance, the second wall 220 may extend generally away from the cell 104 and downward as oriented in FIG. 10.

The overlapped section 120 may further include a third wall 224. The second wall 220 may be further connected to a third wall 224. The third wall 224 may be connected to the second wall 220 and extend in a direction away from the second wall 220 as shown. The third wall 224 may be integral with the second wall 220 such that they are formed from the same monolithic piece of material. The third wall 224 may be connected or coupled with the second wall 220 in the same or similar manner described with respect to the connection between the second wall 220 and the first wall 204 of FIG. 10.

The third wall 224 may include a rib edge 221 (e.g., free end, second rib edge, rib end, second rib end). The rib edge 221 of the third wall 224 may be on an end of the third wall 224 opposite that of the end that is connected with the second wall 220. The rib edge 221 may therefore be an edge of the overlapped section 120 and thus an edge of the ribs 102. The rib edge 221 may have a projection or curve 225 connected to the rib edge 221. The projection 225 may rest against a support surface as discussed herein. As shown, the third wall 224 may extend past the base 103 or bottom surface 111 of the cell 104. The third wall 224 may extend in a generally downward direction as oriented in the figure such that the rib edge 221 is in a same or similar plane as the base 103 or bottom surface 111 of the cell 104. The rib edge 221 may be generally flat. The rib edge 221 may have other shapes, such as pointed, rounded, segmented, other shapes or contours, or combinations thereof.

The overlapped section 120 may have a variety of sizes and dimensions. As shown, the overlapped section 120 may have a height equivalent to the dimension H1 as shown in FIG. 10 between an exterior or top surface of the second wall 220 (e.g., surface configured to be overlapped by the overlapping section 130) and the rib edge 221 (e.g., surface of the rib edge 221 configured to rest against a support surface as discussed herein).

As further shown, the overlapped section 120 may have a width or length equivalent to the dimension W1 as indicated in FIG. 10. The dimension W1 may be between exterior surfaces of the first wall 204 and the third wall 224 (e.g., surfaces of the first wall 204 and the third wall 224 configured to be overlapped by the overlapping section 130).

As mentioned, the cells 104 may define a cell volume 105. As shown in FIG. 10, the cell volume 105 may extend from the base 103 to a top edge of the overlapped section 120. The cell volume 105 may extend from the base 103, over or into the channel 170, to the second wall 220. Further, the cell volume 105 may extend from one first wall 204 to an opposite first wall 204, as shown. The cell volume 105 may therefore have an outer contour that matches the inner surfaces defining the cell 104. For example, the cell volume 105 may be bounded by the first wall 204, as well as by the base 103. Further, as mentioned, the cell volume 105 is shown in dashed lines because it is a geometric reference as opposed to a physical feature of the formliner 100. The dashed lines indicating the boundary of the cell volume 105 are slightly offset from the various bounding features of the cell 104 for purposes of clarity, however it is understood that the cell volume may extend to and contact these various features, as described herein.

The overlapped section 120 may define or otherwise form a first space 222. As shown, the first space 222 may be bounded on three sides by the overlapped section 120. The first space 222 may be empty space as shown. The first space 222 may be filled, either partially or entirely, with material. The overlapped section may include a solid first space 222 with the first wall 205, the second wall 230, and the third wall 224 being outer surfaces of the first space 222. As illustrated, the first wall 204, the second wall 220, and the third wall 224 may form a generally C-shaped cross-sectional profile (e.g., C section) at least partially bounding the first space 222. The generally C-shaped cross-sectional profile can be rounded (e.g., horse-shoe shaped) or with a square/rectangular configuration as illustrated in FIG. 10.

Figure 11:
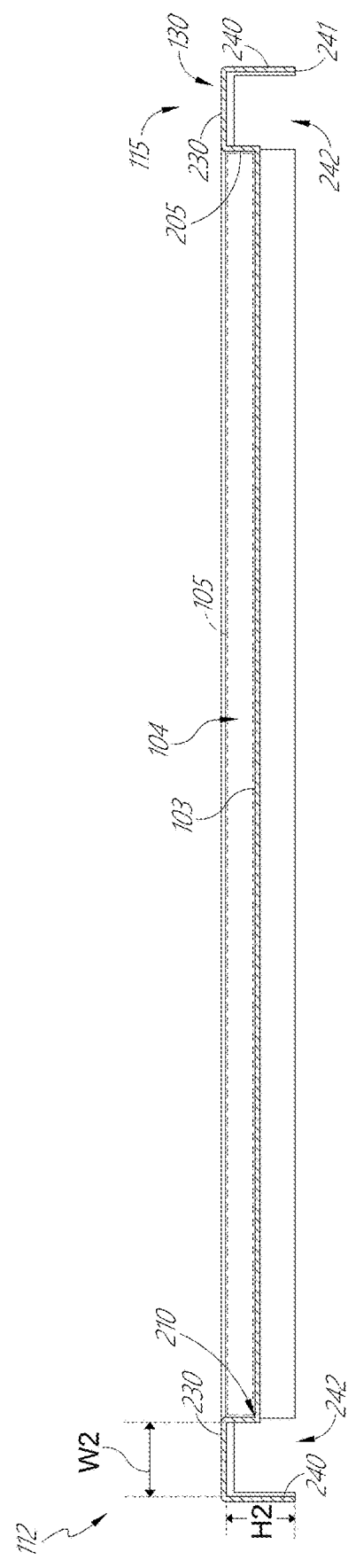
FIG. 11 is a cross-section view of a portion of the formliner of FIGS. 1-2 as taken along the line 11-11 as indicated in FIG. 5.

FIG. 11 is a cross-section view of a portion of the formliner as taken along the line 11-11 as indicated in FIG. 5. As shown in FIG. 11, the cell 104 may be bounded on opposite sides by the perimeter 210 and/or the boundary 115, where the boundary 115 includes the overlapping sections 130. The overlapping sections 130 may include a first wall 205 (e.g., a fourth wall) connected to and extending away from the base 103 as shown. The first wall 205 of the overlapping section 130 may have similar features and functionalities as the first wall 204 of the overlapped section 120 described herein.

The overlapping sections 130 may include a second wall 230 (e.g., a fifth wall). The first wall 205 may connect with the second wall 230. The second wall 230 may have similar features and functionalities as the second wall 220 of the overlapped section 120. For example, the second wall 230 may extend generally outward or away from the cell 104 (e.g., generally parallel with the base 103). The direction of extension of the second wall 230 may be generally perpendicular to the general direction of extension of the first wall 205. The second wall 230 may also extend in any direction that is substantially parallel with the base 103.

The overlapping sections 130 may include a third wall 240. The second wall 230 may connect with third wall 240. The second wall 230 may have similar features and functionalities as the second wall 220 of the overlapped section 120. The third wall 240 may be connected to the second wall 230 and extend in a direction away from the second wall 230 as shown. The third wall 240 may be integral with the second wall 230 such that they are formed from the same monolithic piece of material. The third wall 240 may be connected or coupled with the second wall 230 in the same or similar manner described with respect to the connection between the second wall 220 and the first wall 204 of FIG. 10.

As further shown in FIG. 11, the third wall 240 may have a rib edge 241 (e.g., free end, first rib edge, rib end, first rib end). The rib edge 241 of the third wall 240 may be on an end of the third wall 240 that is opposite that of the end that is connected to the second wall 230. As shown, the third wall 240 may extend past or beyond the base 103 or bottom surface 111 of the cell 104. The third wall 240 may extend in a generally downward direction as oriented in the figure such that the rib edge 241 is in a same or similar plane as the base 103 or bottom surface 111 of the cell 104. The third wall 240 may extend in a direction generally parallel to the first wall 205, generally perpendicular to the second wall 230, and/or generally perpendicular to the base 103 or bottom surface 111.

Each of the walls of the ribs 102 can have an extent, length, dimension along the cross-sectional profiles illustrated in, for example, FIGS. 10 and 11. Where the extents of the wall of the ribs 102 connect can form edges or corners of the ribs 102 or walls. For example, the connection of the first wall 204 to the second wall 220 can form an edge or corner as illustrated in, for example, FIG. 10. The second wall 220 connecting to the third wall 224 can form an edge or corner as illustrated in, for example, FIG. 10. The connection of the first wall 205 to the second wall 230 can form an edge or corner as illustrated in, for example, FIG. 11. The second wall 230 connecting to the third wall 240 can form an edge or corner as illustrated in, for example, FIG. 11. The dimension or length between the edges or corners can be an extent of the walls as discussed herein. The extents can be perpendicular to a corresponding extent where the walls connect.

Similar to the cell 104 as described in FIG. 10, the cell 104 shown in FIG. 11 may also be bounded by the side of the first wall 205 that faces the cell 104. Thus the first wall 205 may extend around the boundary of the cell 104, such that a portion of the first wall 205 is visible in between the two cross-sections of the overlapping sections 130 as oriented in FIG. 11.

As further shown in FIG. 11, the cell 104 may include a perimeter, boundary or perimeter 210 (e.g., an inner perimeter, boundary, or periphery). As shown, the perimeter 210 may be formed by the interface of the base 103 with the first wall 205. The perimeter 210 may be a vertex formed by the intersection of the base 103 and the first wall 205. The perimeter 210 may therefore be inside the cell 104. The perimeter 210 may not be a sharp corner but may be rounded instead. The perimeter 210 may be a sharp corner in some locations along the perimeter 210 of the cell 104 and it may be rounded or other shapes at other portions of the perimeter 210 of the cell 104. Further, the perimeter 210 may generally extend beyond the intersection of the first wall 205 and the base 103 within, for example, the cell volume 105. The perimeter 210 may have contours and shapes that follow along a textured pattern that may formed in the base 103 as discussed herein. For example, the perimeter 210 may be not a straight line along the intersection of the base 103 and the first wall 205.

Further shown in FIG. 11 is the cell volume 105. The cell volume 105 may have any of the features and functionalities as described herein. Further, the cell volume 105 may be defined by the various features of the cell 104 as described with respect to FIG. 11. For example, the cell volume 105 may be defined by the first wall 205, the base 103, the perimeter 210, and/or other features.

The overlapping section 130 may have a variety of sizes and dimensions. Further, because the overlapping section 130 of one formliner may be assembled with the overlapped section 120 of another formliner, the various dimensions of these sections may be sized to facilitate such overlapping. That is, the overlapping section 130 of a second formliner 100 may overlay onto the overlapped section 120 of a first formliner 100. Therefore, the second wall 230 of the overlapping section 130 of a second formliner 100 may rest on the second wall 220 of the overlapped section of a first formliner 100. Similarly, the outer surface of the first wall 204 of the overlapped section 120 of a first formliner 100 may abut or otherwise contact the third wall 240 of the overlapping section 130 of a second formliner 100. As indicated in FIG. 11, the second wall 230 may have a length or width equivalent to the dimension W2, and the third wall 240 may have a length or height equivalent to the dimension H2 based on inner surfaces of the second and third walls 230, 240 (e.g., surfaces facing the second space 242).

The overlapping section 130 may define or form a second space 242. As shown and as oriented in FIG. 11, the second space 242 may be defined by the area underneath the second wall 230, on the side of the first wall 205 that is opposite from the cell 104, and enclosed by the third wall 240. As shown, the second space 242 may have a length or width equivalent to the dimension W2 as indicated. W1 and W2 can be about ¼ inches. W1 and W2 can be about ¹⁄₁₆ to about 1.5 inches, including about ⅛ to about 1 inches, including about ¼ to about ½ inches, including the foregoing values and ranges bordering therein. As further shown, the second space 242 may have a length or height equivalent to the dimension H2. H2 may substantially correspond and/or be substantially a same or similar length or extent as H1'.

As illustrated, the first wall 205, the second wall 230, and the third wall 240 may form a generally C-shaped cross-sectional profile (e.g., C section) at least partially bounding the second space 242. The generally C-shaped cross-sectional profile can be rounded (e.g., horse-shoe shaped) or with a square/rectangular configuration as illustrated in FIG. 11. The second space 242 defined by the overlapping section 130 of the formliner 100 may be configured to receive a portion of the overlapped section 120 of another formliner, as discussed in further detail herein, for example with respect to FIGS. 16-17.

Figure 16:
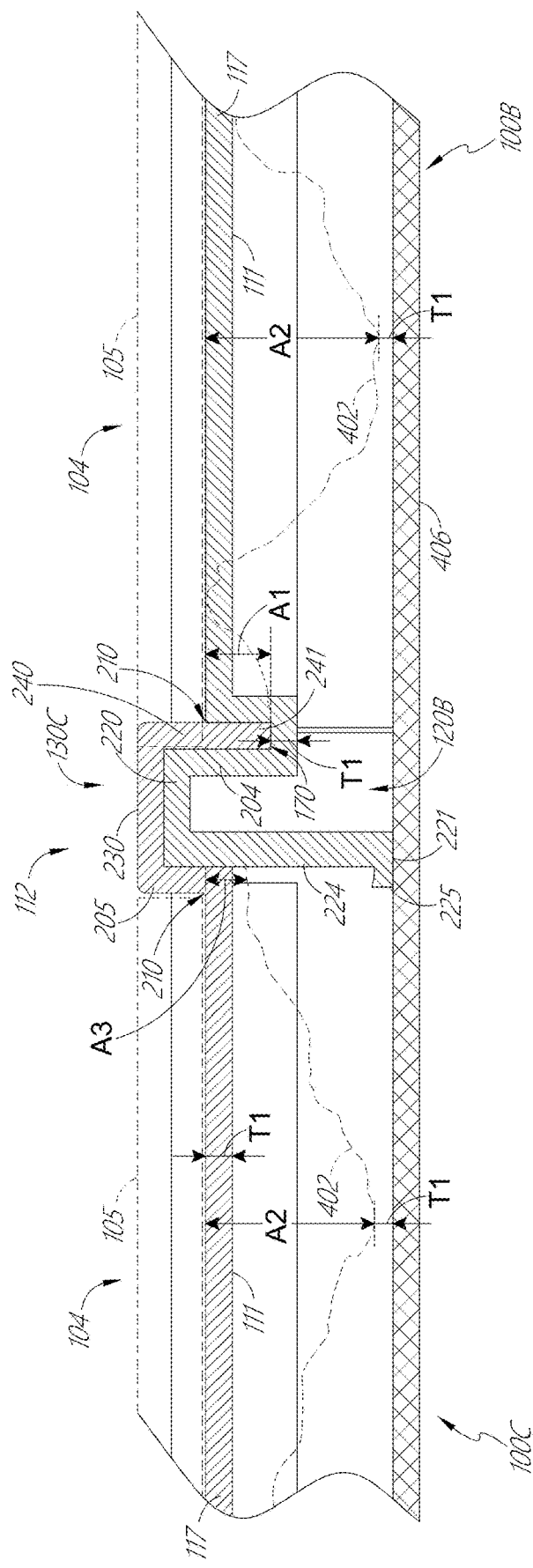
FIG. 16 is a cross-section view of a portion of the assembly of FIG. 14 as taken along the line 16-16 as indicated in FIG. 14.
Figure 17:
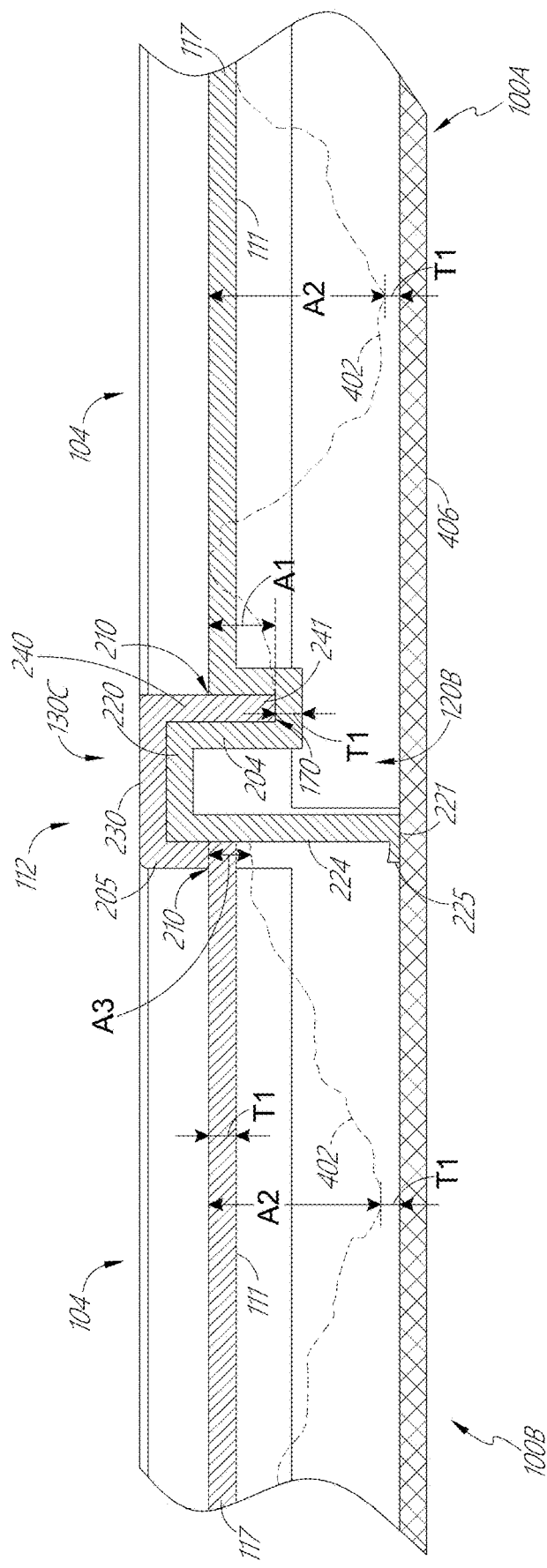
FIG. 17 is a cross-section view of a portion of the assembly of FIG. 14 as taken along the line 17-17 as indicated in FIG. 14.

As discussed in further detail herein, for example with respect to FIGS. 16-17, the overlapping section 130 may overlay onto the overlapped section 120. Therefore, the dimension W1 shown in FIG. 10 may be substantially equivalent to the dimension W2 in FIG. 11. Thus, the length of the second wall 220 of the overlapped section 120 that extends beyond the first wall 204 may be substantially equivalent to the length of the second wall 230 of the overlapping section 130. Similarly, the length of the first space 222 as indicated by the dimension H1 may be substantially equivalent to the length of the third wall 240 of the overlapping section 130 indicated by the dimension H2. W1 can be equivalent to W2. However, there may be some reasonable deviation between W1 and W2. W1 may be slightly less than W2, for example to accommodate manufacturing tolerances. Similarly, H1 may be equivalent to H2. However, some reasonable deviation between H1 and H2 may be implemented. H1 may be slightly larger than H2, for example to accommodate for manufacturing tolerances. These are just some of the possible relationships between the dimensions and others are possible.

FIG. 12 is a cross-section view of a portion of the formliner 100 as taken along the line 12-12 as indicated in FIG. 5. As shown, the overlapped section 120 may include a top surface 250 that is lower than a top surface 260 of the internal section 108. As shown, the top surface 250 may be connected to the top surface 260 by a channel 170. The channel 170 may therefore connect the top surface 250 of the overlapped section 120 to the top surface 260 of the internal section 108.

FIG. 13 is a cross-section view of a portion of the formliner 100 as taken along the line 13-13 as indicated in FIG. 6. As shown, two cells 104 may be on either side of the conduit 110. The conduit 110 may be formed or defined by the walls 215 that are in between the conduit 110 and the two adjacent cells 104. The walls 215 may have similar features and/or functionalities as the first wall 204 and/or the first wall 205 described, for example, with respect to FIGS. 10 and 11. The walls 215 need not have various angled or straight portions. The walls 215 may be a single segment. For example, the walls 215 may be one angled portion, one straight portion, or other suitable configurations.

The wall 215 may be connected to or otherwise coupled with the base 103. As shown, the angled portion 216 of the wall 215 may be connected to or otherwise coupled with the base 103. The wall 215 and the corresponding base 103 to which the wall 215 is coupled may be formed from the same continuous monolithic piece of material. The wall 215 may be a separate piece that is mechanically connected with the base 103.

The walls 215 of the two adjacent cells 104 may be connected by a bridge 218 (e.g., similar to second walls 220, 230). The bridge 218 may be connected to or otherwise coupled with the walls 215. As shown, the bridge 218 may be connected to or otherwise coupled with the straight portion 217 of the walls 215. Therefore, the conduit 110 may be defined by the walls 215 and the bridge 218. The conduit 110 is shown as a space defined by the various structures. The conduit 110 may be filled in partially or entirely with material, as mentioned. Therefore, the walls 215 and/or the bridge 218 may be surfaces of the conduit 110. For example, the conduit 110 may be a solid piece of material wherein the side surfaces of the conduit 110 may form the wall 215 and the end of the conduit 110 may form the bridge 218.

Figure 14:
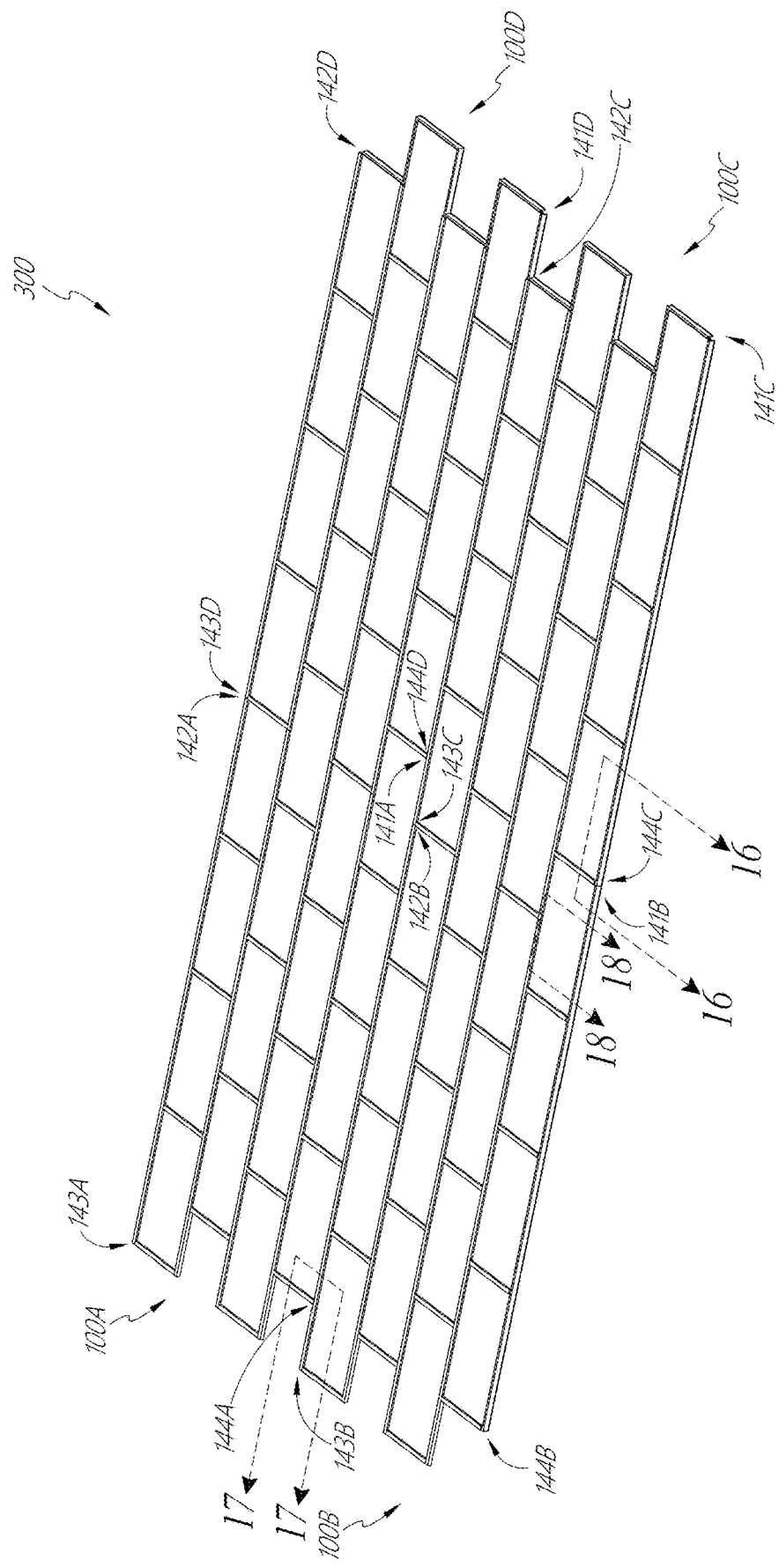
FIG. 14 is a top perspective view of an assembly of formliners.
Figure 15:
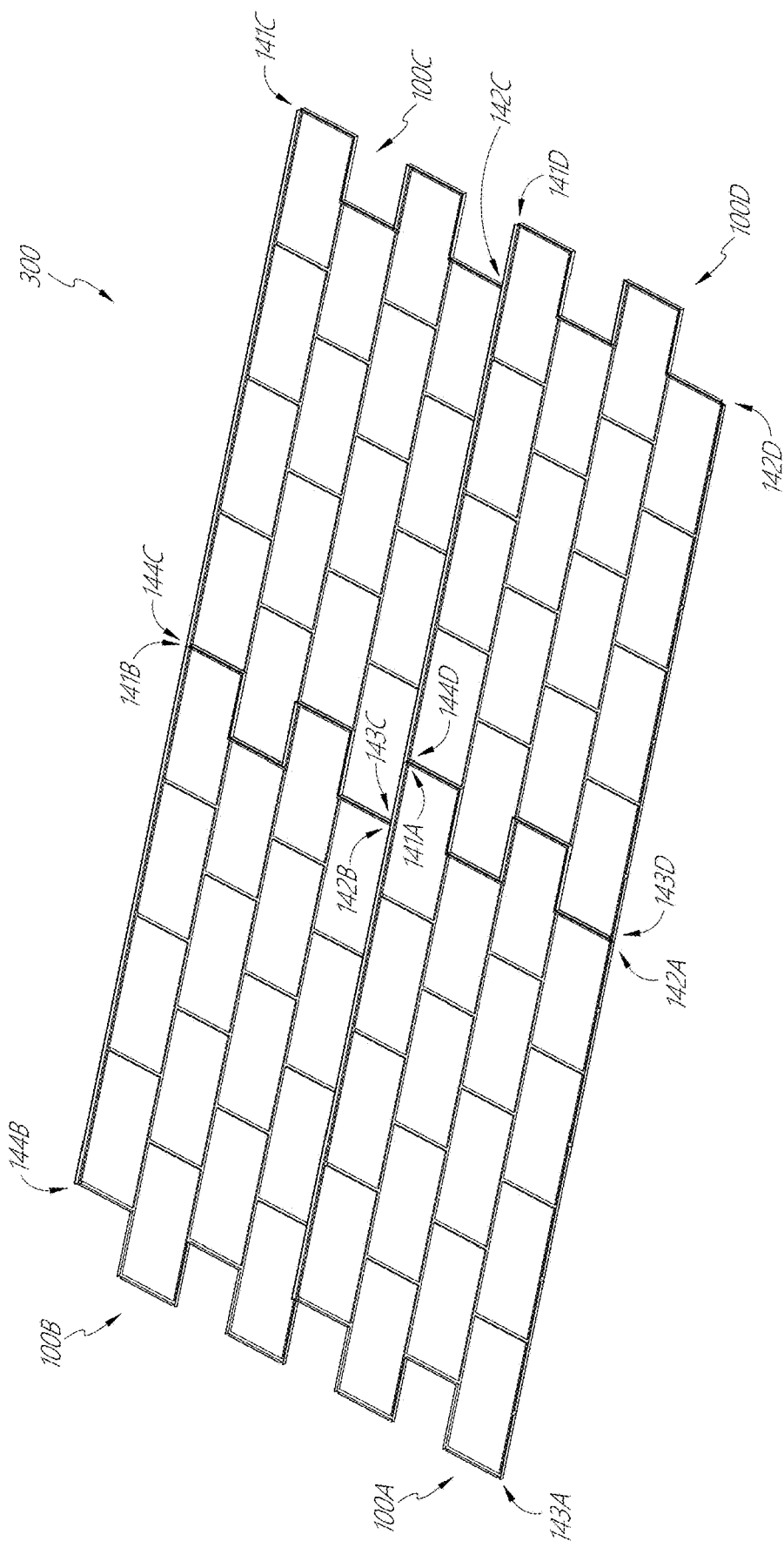
FIG. 15 is a bottom perspective view of the assembly of FIG. 14.

FIG. 14 is a top perspective view of an assembly 300 of various formliners, and FIG. 15 is a bottom perspective view of the assembly 300. As shown, the assembly 300 may include a (first) formliner 100A, a (second, at least one other, third) formliner 100B, a (fourth) formliner 100C and a (second, at least one other, third) formliner 100D. These formliners may be the same or similar as the formliner 100 described herein. Therefore, although different designations maybe given to the various formliners shown in the assembly 300, it is understood that the four formliners 100A, 100B, 100C, 100D may all be the same formliner. In this manner, multiple formliners with the same configurations may be assembled together. Further, the assembly 300 is merely one example, and the formliners may be assembled in other configurations. Two, three, five, six, ten, fifteen, fifty or more formliners may be assembled together.

As shown, the four formliners 100A, 100B, 100C, 100D may be assembled in a 2×2 assembly. That is, the assembly 300 may include two formliners 100A, 100B aligned next to two other formliners 100C, 100D that may be similarly aligned. The four assembled formliners 100A, 100B, 100C, 100D as shown may have similar features and functionalities as the formliner 100 described above. For example, the formliner 100A may have a first corner 141A, a second corner 142A, a third corner 143A, and a fourth corner 144A. Similarly, the formliner 100B may have a first corner 141B, a second corner 142B, a third corner 143B and a fourth corner 144B. Similarly, the formliner 100C may have a first corner 141C, a second corner 142C, a third corner 143C, and a fourth corner 144C. Similarly, the formliner 100D may have a first corner 141D, a second corner 142D, a third corner 143D, and a fourth corner 144D. The various corners may be similar to the corners of the formliner 100 described herein. Thus for example referring to formliner 100A, the first corner 141A may be similar to the first corner 141 of the formliner 100, the second corner 142A may be similar to the second corner 142 of the formliner 100, the third corner 143A may be similar to the third corner 143 of the formliner 100, and the fourth corner 144A may be similar to the fourth corner 144 of the formliner 100. The respective corners of the other three formliners 100B, 100C, 100D in the assembly 300 may also have the same features and/or functionalities as the respective corners of the formliner 100.

As shown, the formliners 100A, 100B, 100C, 100D may be assembled by bringing together various complementary portions of the boundaries of the formliners. Thus, the first corner 141A of the formliner 100A may contact, interface with, abut, join, assemble with, meet, or otherwise be adjacent to the fourth corner 144D of the formliner 100D. The second corner 142B of the formliner 100B may be adjacent to the third corner 143C of the formliner 100C. These junctures of the formliners in the assembly 300 may be generally on the interior of the assembly 300. However, there may be junctures along or near the outer perimeter of the assembly 300. As shown, the first corner 141B of the formliner 100B may be adjacent to the fourth corner 144C of the formliner 100C. The second corner 142A of the formliner 100A may be adjacent to the third corner 143D of the formliner 100D. The fourth corner 144A of the formliner 100A may be near the third corner 143B of the formliner 100B. The first corner 141D of the formliner 100D may be near the second corner 142C of the formliner 100C.

The order of assembly of the formliner 100A, 100B, 100C, 100D may be as follows. The first formliner positioned for assembly may be formliner 100D. Next, the overlapping sections 130 of either formliner 100A or formliner 100C can be overlaid onto the overlapped sections 120 of formliner 100D. For example, formliner 100A can be laid down as the first formliner, and formliner 100B can be laid down as the second formliner assembled. The formliner 100D can be laid down as the third (at least one other) formliner assembled, and the formliner 100C can be laid down as the fourth formliner assembled. As another example, formliner 100A can be laid down as the first formliner, and formliner 100D can be laid down as the second formliner assembled. The formliner 100B can be laid down as the third (at least one other) formliner assembled, and the formliner 100C can be laid down as the fourth formliner assembled. Any of the formliner 100A, 100B, 100C, 100D can be laid down simultaneously to interconnect as discussed herein. When continuing to assemble five or more formliners, assembled formliner 100C can be considered the first formliner (e.g., as formliner 100A was when connecting the first four formliners) to connect with additional formliner in one or more orders discussed above.

The formliners may also contact each other (e.g., connect, assemble, overlay) along the boundaries 115 of the formliners. As shown, the formliner 100B may contact the formliner 100C along an interface from the juncture of the second corner 142B and the third corner 143C, and extending to the juncture of the first corner 141B and the fourth corner 144C. Similarly, the formliner 100A may contact the formliner 100D along an interface extending from the juncture of the second corner 142A and the third corner 143D to the juncture of the first corner 141A and the fourth corner 144D, and similarly for other corresponding corners of the formliners (e.g., 144A and 143B as well as 142C and 141D). Along these interfaces, the various transition zones of the formliners may contact the overlapping sections of adjacent formliners. The overlapping section 130D of the formliner 100D may contact in various locations the channel(s) 170A and/or transition zones 107A of the formliner 100A. Similarly, the overlapping section 130C of the formliner 100C may contact various channels 170B and/or transition zones 107B of the formliner 100B. A cross-section view of one such interface as taken along the line 18-18 as indicated in FIG. 14 is shown in FIG. 18. Similar interface may exist between the formliner 100A and the formliner 100D and/or the other interconnecting formliners.

The various formliners may further have interfaces along other sides of the boundaries of the formliners. As shown in FIG. 18, the formliner 100B may contact the formliner 100C along an interface that extends from the second corner 142B to the fourth corner 144C. Similarly, the formliner 100A may contact the formliner 100B along an interface that extends from the first corner 141A to the third corner 143B. These interfaces may be generally straight as shown, however other configurations may be implemented. Further, along these interfaces the formliners may contact the transition zones of adjacent formliners.

FIGS. 16-18 show various cross-section views as taken along respective lines as indicated in FIG. 14. FIG. 16 is a cross-section view of a portion of the assembly 300 as taken along the line 16-16. FIG. 17 is a cross-section view of a portion of the assembly 300 as taken along the line 17-17. FIG. 18 is a cross-section view of a portion of the assembly 300 as taken a long line 18-18. FIG. 19 is a cross-section view of a portion of an other assembly 300 as taken a long line 18-18. While FIGS. 16 and 17 show the rib system 112 substantially forming a raked joint and FIGS. 18 and 19 show the rib system 112 substantially forming a flush joint, it is understood that the features, functionalities, and concepts of the rib system 112 discussed herein can be applied to tool joints, vee joints, concave joints, ironed joints, extruded joints, beaded joints, struck joints, weathered joints, squeezed or weeping joints, grapevine joints, and/or other suitable joints used in curable material designs.

Referring to FIG. 16, a portion of the assembly 300 is shown where the formliner 100B interfaces with the formliner 100C. As shown, the overlapping section 130C overlaps the overlapped section 120B. This overlapped section 120B may be similar to the overlapped section 120 described herein. This overlapping section 130C may be similar to the overlapping section 130 described herein. The overlapped section 120B may include the first wall 204 coupled with the second wall 220, and the second wall 220 coupled with the third wall 224. Therefore, as shown the overlapping section 130C may include the first wall 205 coupled with the second wall 230, and the second wall 230 coupled with the third wall 240. Further, the third wall 224 may have the rib edge 221, the third wall 240 may have the rib edge 241.

As shown, the overlapping section 130C at least partially abuts and partially rests upon the overlapped section 120B. The two formliners 100B and 100C may be brought into contact with each other in a variety of ways. For example, the formliners 100B and 100C may be manually brought into contact with each other by a user, a machine may place them in the shown configuration, other processes may be used, and/or come combinations thereof. As shown, the third wall 240 may contact the first wall 204. The third wall 240 may abut the first wall 204. There may be no void or space in between the third wall 240 and the first wall 204 such that the respective surfaces completely/directly contact each other. The third wall 240 may partially contact the first wall 204.

As shown in FIG. 16, the assembled formliners 100B, 100C may include the third wall 240 contacting or otherwise being located near or adjacent to the first wall 204. The third wall 240 may contact or otherwise be near the lower portion 212. The rib edge 241 may contact or otherwise be near the first wall 204. The rib edge 241 may contact or otherwise be near or adjacent to the base 103. The rib edge 241 may be coplanar or coextensive (e.g., end) with the bottom surface 111 of the cell 104 of the formliner 100B. Therefore, a variety of configurations between the third wall 240 and the first wall 204 may be implemented.

The assembled formliners 100B, 100C may include the second wall 230 contacting or otherwise being adjacent to the second wall 220. As shown, the second wall 230 may substantially contact the second wall 220. However, similar to the interface between the third wall 224 and the first wall 205, the second walls 220, 230 need not entirely contact one another. The second wall 220 may partially contact the second wall 230. The second wall 220 may be near or otherwise adjacent to the second wall 230. As shown, the second wall 230 may extend such that it is substantially coextensive with the first wall 205 (e.g., end at or on end of the first wall 205 or where the first wall 205 and the second wall 230 are connected, such as, for example where the first wall 205 and the second wall 230 form a corner). The rib edge 241 may therefore be coextensive with an edge or surface of the first wall 205. The rib edge 241 of the third wall 240 may be coextensive with a straight portion of the first wall 205. As shown in FIG. 16 (and FIG. 17), the overlapping section 130C (e.g., first, second, and third walls 205, 230, 240) can be overlaid to extend about half of an overall length the overlapped section 120B (e.g., the first, second, and third walls 204, 220, 224). In particular, the combined length of the first, second, and third walls 205, 230, 240 of the overlapping section 130C can extend about half the combined length the first, second, and third walls 204, 220, 224 of the overlapped section 120C.

The formliners 100B, 100C may include the cell volume 105 defined by the cell 104 and the base 103. As shown, the cell volume 105 may be a space defined or otherwise formed by the perimeter of the cell 104. As shown, the formliner 100C (e.g., overlapping section 130C and in particular, the third wall 240) may extend adjacent to the cell volume 105 and enter the cell volume 105 of formliner 100B. The third wall 240 of the overlapping section 130C may extend close to or adjacent to the cell volume 105 and/or extend into the cell volume 105 (e.g., contact or extend downwardly into the cell 104 or cell volume 105 toward the perimeter 210 of the formliner 100B, such as for example, into the channel 170). The second wall 230 of the overlapping section 130C may extend close to or adjacent to the cell volume 105 and/or extend into the cell volume 105 (e.g., contact or extend horizontally into the cell 104 or cell volume 105 depending on where the second wall 230 and the third wall 240 are connected/divided).

As discussed herein, the perimeter 210 may be not a straight line, but have an outline or contour that generally follows a textured pattern or decorative pattern 402 of or in a base 103 as discussed herein (e.g., where the first wall 205 and the base 103 connect or where the channel 170 and the base 103 connect). The decorative pattern 402 is illustrated by dashed lines. The dashed lines can represent an extent or path of a top exterior surface 117 of the base 103 along the decorative pattern 402 (the top exterior surface 117 of the base 103 configured to face the curable material). The decorative pattern 402 illustrated by dashed lines is just one example of a possible pattern. Many other patterns corresponding to desired surface patterns as discussed herein may be used. The decorative pattern 402 can be formed by any suitable manufacturing process as discussed herein. For example the formliner 100 may be heated (e.g., in an oven) and vacuum pulled against a form or mold comprising or having the decorative pattern 402. In the process of forming the formliners 100 (including cells 104, ribs 102, etc.) the base 103 can be vacuum pulled against a portion of the mold having the decorative pattern 402.

For illustration and discussion purposes, a support surface 406 is shown in FIGS. 16 and 17. The bottom surface 111 and/or third wall 224 (e.g., rib edge 221) may wholly, partially, substantially contact, abut, come against a support surface 406. The support surface 406 can be or correspond to the platform 606 as discussed herein, and in particular, in reference to FIG. 22. The support surface 406 may be the ground, floor, or other substantially flat or planar surface (e.g., a tabletop) against which a formliner rests in a desired position. Such contacts against a support surface 406 can provide support, structural integrity (substantial resistance to deformation given a desired curable material), and weight bearing capabilities to the respective formliners 100 and/or boundaries 115 as discussed herein. As shown, the decorative pattern 402 can vary such that some portions or parts of the bottom surface 111 may contact the support surface 406 with other portions of the bottom surface 111 not contacting the support surface 406 where the base 103 (and correspondingly the bottom surface 111) has a textured pattern as discussed herein.

Depending on for example, the decorative pattern 402, the perimeter 210 can have a changing or substantially random contour, line, or edge following the outline of the decorative pattern 402 formed in the base 103. The decorative pattern 402 can have an amplitude A1 substantially corresponding to an extent of the decorative parent pattern 402 at the perimeter 210 (or boundary 115) of the cell 104. The amplitude A1 can correspond or be substantially similar or equal to the height H1" of the channel 170 as discussed herein. The amplitude A1 can be smaller or shorter relative to the height H1". The amplitude A1 can substantially correspond to, be the same or similar to, and extend from a top exterior surface 117 of the base 103 configured to face curable material to a top interior surface of the channel 170 (e.g., surface of the channel facing, adjacent, and/or contacting the rib edge 241 and opposite a bottom exterior surface of the channel 170 configured to face a support surface 406 as discussed herein).

As shown, the height H1" of the channel 170 can substantially correspond to the amplitude A1 of the decorative pattern 402 at the perimeter 210 of the cell 104. Stated differently, the decorative pattern 402 can extend toward the support surface 406 an extent (A1) substantially equal an extent of the channel 170 (H1"). In such implementations, the channel 170 may substantially not be present, provided, or formed relative to the base 103. For example, a top exterior surface 117 of the base 103 configured to face the curable material may be substantially at a same level or substantially along a same plane as a top interior surface of the channel 170 configured to face the rib edge 241. Accordingly, the channel 170 may substantially have no depth or extension height or length relative to the top exterior surface 117 of the base 103 at the perimeter 210 of the cell 104.

The decorative pattern 402 can extend toward the support surface 406 at the perimeter 210 less than an extent of amplitude A1 that is shown in FIGS. 16 and 17 (e.g., less than an extent of the channel 170 (H1")). The decorative pattern 402 relative to a level or plane of the base 103 may not have an extent or amplitude at the perimeter 210. Accordingly, the decorative pattern 402 may have an extent or an amplitude of substantially zero at the perimeter 210 of the cell 104. Such an extent or amplitude of zero can correspond substantially to a level of the top exterior surface 117 of the base 103 as illustrated in FIGS. 16 and 17.

As shown in FIGS. 16 and 17, the decorative pattern 402 can have a variance in pattern extending to the support surface 406 at a maximum extent or maximum amplitude A2. At amplitude A2 of the decorative pattern 402, the base 103 can extend toward the support surface 406 such that the bottom surface 111 of the base 103 contacts the support surface 406 to, for example, provide rigidity and structural integrity to the cell 104, rib system 112 (e.g., ribs 102), and/or formliner 100.

For additional support, the rib edge 221 of the overlapped section 120B can extend toward the support surface 406 at, for example length or height H1. The rib edge 221 can contact the support surface 406. When the formliners are assembled and placed against a support surface 406, the rib edge 221 can provide structural support to the rib system 112 and/or cells 104. For example, when the overlapping section 130C is overlaid onto the overlapped section 120B, the rib edge 221 can provide rigidity and structural integrity to the overlapped section 120B while in turn providing rigidity and structural integrity to the overlapping section 130C.

As discussed herein, the channel 170 can have a length or height H1" that is less than the length or height H1 or H1'. As shown, a bottom surface of the channel 170 configured to face the support surface does not extend to or contact the support surface 406. It is understood that in certain implementations, length H1" of the channel 170 may be substantially equal or have a same extent as length H1 of the third wall 224. Accordingly, the formliner 100 may be formed such that the channel 170 (e.g., bottom surface) contacts the support surface 406 for further rigidity and structural integrity.

The length or height H1" of the channel 170 can be determined and designed based on various variables and inputs depending on the desired formliner 100. For example, the variables may include desired or predetermined thickness T1 (FIG. 17) of the formliner 100. The desired thickness T1 may be determined based on the desired reusability of the formliner 100. For example, if multiple uses of the formliner 100 are desired, the thickness T1 may be made greater or larger. A single use formliner 100 may have a relatively shorter thickness T1. The thickness T1 may be substantially uniform or have a same thickness throughout the formliner 100 in, for example, the cell 104 (e.g., base 103 (including decorative pattern 402)), rib system 112, including the channel 170. In some implementations, the thickness T1 may vary depending on the desired characteristics and/or manufacture of the formliner 100. The variables may include the desired or predetermined decorative pattern 402, such as for example, amplitudes A1 and A2. Relatively longer or larger amplitudes A1 and A2 of the decorative pattern 402 may result in relatively longer or larger heights H1" of the channel 170, which may increase desired thickness T1 of the formliner 100. The variables may include a desired or predetermined length or height H1 of the third wall 224.

Relatively longer or larger height H1 of the third wall 224 may result in relatively longer or larger heights H1" of the channel 170 and/or relatively longer or larger amplitudes A1 and A2 of the decorative pattern 402, which may increase desired thickness T1 of the formliner 100.

A consideration during formation/manufacture of the formliner may be the resulting thickness T1 of the formliner 100 in various sections of the formliner 100 after vacuum pulling the formliner 100 onto the mold (e.g., vacuum formation process that thins the formliner material from an initial thickness to a thickness T1 as discussed herein). For example, if the section of the formliner 100 corresponding to the channel 170 is pulled too deeply or too much (H1" is relatively long such as approaching the length of H1) where the formliner material is stretched too thinly, the formliner 100 may have undesirable characteristics (e.g., bubbling or other manufacturing defects) at, for example, the channel 170 after manufacture. Accordingly, the depth or length H1" of the channel 170 may be reduced or shortened (e.g., designed to be shallower, including not contacting the support surface 406) to mitigate or substantially prevent the undesirable characteristics.

On the other hand, if the decorative pattern 402 has a relatively long or large amplitude A1 at the perimeter 210 of the cell 104, the length H1" of the channel 170 may be increased to accommodate the relatively longer amplitude A1. The larger or longer amplitudes A1 and/or A2 are (e.g., corresponding to a deeper or more varying decorative pattern 402), the more stretched out or thinner the formliner material will be after formation of the formliner 100. In such cases, the material thickness T1 of the formliners 100 may be increased to accommodate the longer length H1" while mitigating or substantially preventing undesirable manufacturing defects. A complicated decorative pattern 402 may also require a relatively larger or thicker material thickness T1.

The material thickness T1 of the formliners 100 may determine the length or width W3 (FIG. 18) of the channel 170. The thicker the material thickness T1 of the formliner 100, the longer or larger the width W3 of the channel 170 may have to be to accept, engage, mate, and/or connect with the rib edge 241 as discussed herein. The width W3 of the channel 170 may be designed to have a zero plus tolerance relative to the material thickness T1 of the formliner 100 to accept, engage, mate, and/or connect with the rib edge 241 as discussed herein. For example, the width W3 of the channel 170 may be designed to substantially be the same as, substantially be equal to, and/or greater than the thickness T1. Accordingly, while the rib edge 241 may not have an interference fit with the channel 170 in at least some portions, having a zero plus tolerance of the width W3 relative to the thickness T1 may help ensure and help facilitate overlaying the overlapping section 130 onto the overlapped section 120 as discussed herein (e.g., mitigate or substantially prevent situations where the rib edge 241 cannot be inserted into the channel 170 because width W3 is less than or smaller than the thickness T1). In some implementations, the width W3 and the thickness T1 may be designed to provide an interference fit between the third wall 240 and/or free end 241 with the channel 170.

Example dimensions of the formliner can include H1 being about ¾ inches, H1' or H1" being about ¼ to about ⅜ inches, and T1 being about 9/100 to about 1/10 inches. Correspondingly, A1 can be about ¼ inches to about ⅜ inches. A2 can be about 13/20 inches. W3 can be about 9/100 inches to about 1/10 inches. H1 can be about ¼ inches to about 2 inches, including about ½ inches to about 1 inch, including the foregoing values and ranges bordering therein. H1' can be about ¼ inches to about 2 inches, including about ½ inches to about 1 inch, including the foregoing values and ranges bordering therein. H1" can be about ⅛ inches to about 1.9 inches, including about ½ inches to about 1 inch, including the foregoing values and ranges bordering therein. T1 can be about 1/25 inches to about ½ inches, including about 3/50 inches to about ⅕ inch, including the foregoing values and ranges bordering therein. A1 can be about ⅛ inches to about 1.9 inches, including about ½ inches to about 1 inch, including the foregoing values and ranges bordering therein. A2 can be about ⅛ inches to about 1.9 inches, including about ½ inches to about 1 inch, including the foregoing values and ranges bordering therein. W3 can be about 1/25 inches to about ½ inches, including about 3/50 inches to about ⅕ inch, including the foregoing values and ranges bordering therein.

As shown in FIGS. 16-18, the rib edge 241 can extend downward into the cell 104 or cell volume 105 along the first wall 204 to extend into, near, or proximate to the perimeter 210. If the rib edge 241 does not engage the channel 170 (for example, if the rib edge 241 ends somewhere along the vertical extent or longitudinal length of the first wall 204 without entering the channel 170), a substantially visible seam may be formed in the curable material along, for example, the first wall 204 where the rib edge 241 would terminate. Conversely, if the rib edge 241 were to extend up to the perimeter 210 but there was not a channel 170 provided, it would be difficult and cumbersome to form/trim the rib edge 241 such that the end of the rib edge 241 followed the contour/outline of the textured pattern (decorative pattern 402) of the base 103 at the perimeter 210 when the formliners are assembled as discussed herein. Accordingly, such a cumbersome formation as well as assembly process may introduce seams into the formliner assembly that may be visible in the curable material. As shown, the rib edge 241 of the third wall 240 extends into the cell volume 105, and in particular into the channel 170. The rib edge 241 may extend into the channel 170 such that it is adjacent or proximate a top interior surface of the channel 170 facing the rib edge 241.

Many advantages arise from these configurations of the formliners 100B, 100C. One advantage is a structurally sound interface that is convenient to assemble and to disassemble. For example, the overlapped section 120 may have increased stiffness and weight bearing capabilities (e.g., against the weight of the curable material) due in part to the third wall 224. The third wall 240 may extend downward as previously discussed and as shown in FIGS. 16-17 and thereby provide increased stiffness to the overlapped section 120 along the length of the overlapped section 120. Such increased step stiffness may facilitate handling of the formliners without deforming or otherwise damaging them. Further, increased stiffness of the overlapped section 120 may provide a more robust interface that is less susceptible to deformation under the weight of the curable material therein by the third wall 224 (e.g., rib edge 221) abutting or resting on support/resting surface 406 as discussed herein and preventing/inhibiting vertical (e.g., downward) movement of the overlapped section 120 (and correspondingly, the overlapping section 130) along a longitudinal length of the third wall 224 that may be perpendicular to the base 103 or bottom surface 111 as discussed herein. For example, the third wall 224 may help inhibit the second walls 220, 230, the first and third walls 204, 240, and/or the first and third walls 205, 224 from becoming disjointed (e.g., separating from being in direct contact with each other because of kinking/bending) when the curable material is poured against the formliners 100. The curable material may expand or contract within the cells 104. Having the robust interface as shown will mitigate damage or deformation due to this and other influences of the curable material.

Another advantage from the shown interface in FIGS. 16-18 is that there is little or substantially no interference with the curable material inside the cells. For instance, the rib edge 241 is securely engaged within the channel 170 to not enter the cell volume 105 and thereby, may not interfere with the curable material within that cell 104 such as, for example, not form a seam in the curable wall along or within the cell volume 105. By extending the third wall 240 into the channel 170, there will be fewer or substantially no discontinuities visible in the resulting cured material pattern. For instance, the rib edge 241 of the third wall 240 may align with a portion or portions of the first wall 204 such that a continuous surface along the ribs 102 or boundary 115 is produced when the two formliners 100C and 100B are assembled as shown. By forming a continuous surface, the resulting cured material will have fewer visible discontinuities or seams.

FIG. 17 is a cross-section view of a portion of the assembly 300 as taken along the line 17-17 as indicated in FIG. 14. The interface shown in FIG. 17 may have similar features and functionalities as that shown and described with respect to FIG. 16. However, the interface is between the formliner 100A and the formliner 100B. As oriented in FIG. 17, the overlapped section 120 and the overlapping section 130 are now on opposite sides as that shown in FIG. 16. However, similar features and functionalities may apply to the interface in FIG. 17 as those of FIG. 16, and this view is shown to exemplify another interface for other sections of the formliners.

FIG. 18 is a cross-section view of a portion of the assembly 300 as taken along the line 18-18 as indicated in FIG. 14. As shown, the formliner 100B may interface with the formliner 100C. The interface shown in FIG. 18 may have similar features and functionalities as that shown and described with respect to FIGS. 16 and 17. As shown, the interface as described herein with respect to FIGS. 16 and 17 may be implemented without utilizing a third wall 224. As shown, a channel 170 may be provided in an overlapped section 120C to interface with an overlapping section 130B of the rib system 112. A third wall 224 may be provided around, nearby, or proximate to the interface shown in FIG. 18.

As shown, the channel 170 may connect the internal section 108B to the overlapped section 120B. Therefore, the ribs 102 of the formliner 100B may include an overlapped section 120B extending toward and connecting with the channel 170, which in turn may connect with the internal section 108B. As shown, the top surfaces of the overlapping section 130C and the internal section 108B form a generally continuous surface. Thus, the channel 170 may provide a means by which two adjacent formliners may form a substantially continuous surface. By "substantially continuous" it is meant that the resulting pattern formed using the assembled formliners would be acceptable to one of ordinary skill in the art (e.g., minimized or substantially absent seam formed in the curable material). Therefore, there may be a small gap in between adjacent formliners at, near, or proximate to the channel 170. The channel 170 allows the formliner 100B to receive the formliner 100C such that the overlapping section 130C is generally coplanar with the internal section 108B (e.g., external surfaces of the ribs 102 are substantially flush). As shown, the overlapping section 130C may be at least partially on top of the overlapped section 120B.

FIG. 19 is a cross-section view of a portion of an other assembly 300 as taken along the line 18-18 as indicated in FIG. 14. As shown, the formliner 100B may have a transition zone 107B as discussed herein. The formliner 100B may interface with the formliner 100C at the transition zone 107B. The transition zone 107B may be an area or region of the formliners where adjacent formliners interface with each other when assembled together. As shown, the transition zone 107B of the formliner 100C may include a vertical step (or variable cross-section transition) between the internal rib section 108B and the overlapped section 120B. However, the transition zone 107B need not be a vertical step. The transition zone 107B may be a variety of other configurations, such as angled, rounded, multiple segments, other shapes, or combinations thereof. However, other configurations are possible. The transition zone 107 may be an angled step, a rounded feature, other shapes, or combinations thereof. The transition zone 107 may provide a transition between portions of the rib 102 with different cross-sections. The transition zone 107 may provide a transition between portions of the rib 102 that are at different relative heights or lengths with respect to each other. Therefore, the configuration shown is merely one possible transition zone and many others may be implemented.

As shown, the transition zone 107B may connect the internal section 108B to the overlapped section 120B. Therefore, the ribs 102 of the formliner 100B may include an overlapped section 120B extending toward and connecting with the transition zone 107B, which in turn may connect with the internal section 108B. Further, as shown the two adjacent sections of the transition zone 107B may be at different heights. The internal section 108B may be at a higher height (e.g., different or longer length or distance from a base 103 and/or support surface 406) than the overlapped section 120C as oriented in FIG. 19. The internal section 108B may be at a higher height than the overlapped section 120C such that the internal section 108B will form a substantially continuous surface with the adjacent formliner 100C when assembled together.

As shown, the top surfaces of the overlapping section 130C and the internal section 108B form a generally continuous surface. Thus, the transition zone 107B may provide a means by which two adjacent formliners may form a substantially continuous surface. By "substantially continuous" it is meant that the resulting pattern formed using the assembled formliners would be acceptable to one of ordinary skill in the art (e.g., minimized or substantially absent seam formed in the curable material). Therefore, there may be a small gap in between adjacent formliners at the transition zone 107B.

As shown, the transition zone 107B allows the formliner 100C to receive the formliner 100C such that the overlapping section 130C is generally coplanar with the internal section 108B (e.g., external surfaces of the ribs 102 are substantially flush). As further shown, the overlapping section 130C may be at least partially on top of the overlapped section 120B. Further, as shown the upper and lower portions of the transition zone 107B as oriented may have generally the same contour. That is, both the upper and lower surfaces of the transition zone 107B may have a similar vertical step, or other similar contour. However, this may not be the case. The upper and lower portions of the transition zone 107B may have different contours. The upper portion of the transition zone 107B may have a vertical step as shown, while the lower portion may have a different contour. For example, the upper portion of the transition zone 107B may have the vertical step as shown while the lower portion of the transition zone 107B may have an angled, rounded or other contour. Furthermore, the lower portion of the transition zone 107B need not have any transition at all. For instance, the lower portion of the transition zone 107B may merely be a continuation of the lower surface of the overlapped section 120B. While the transition zone 107C as shown and described in FIG. 19 has been taken at one particular location of the assembly 300, it is understood that the features and functionalities described with respect to this transition zone 107B may apply equally to other transition zones of the assembly 300.

Figure 20:
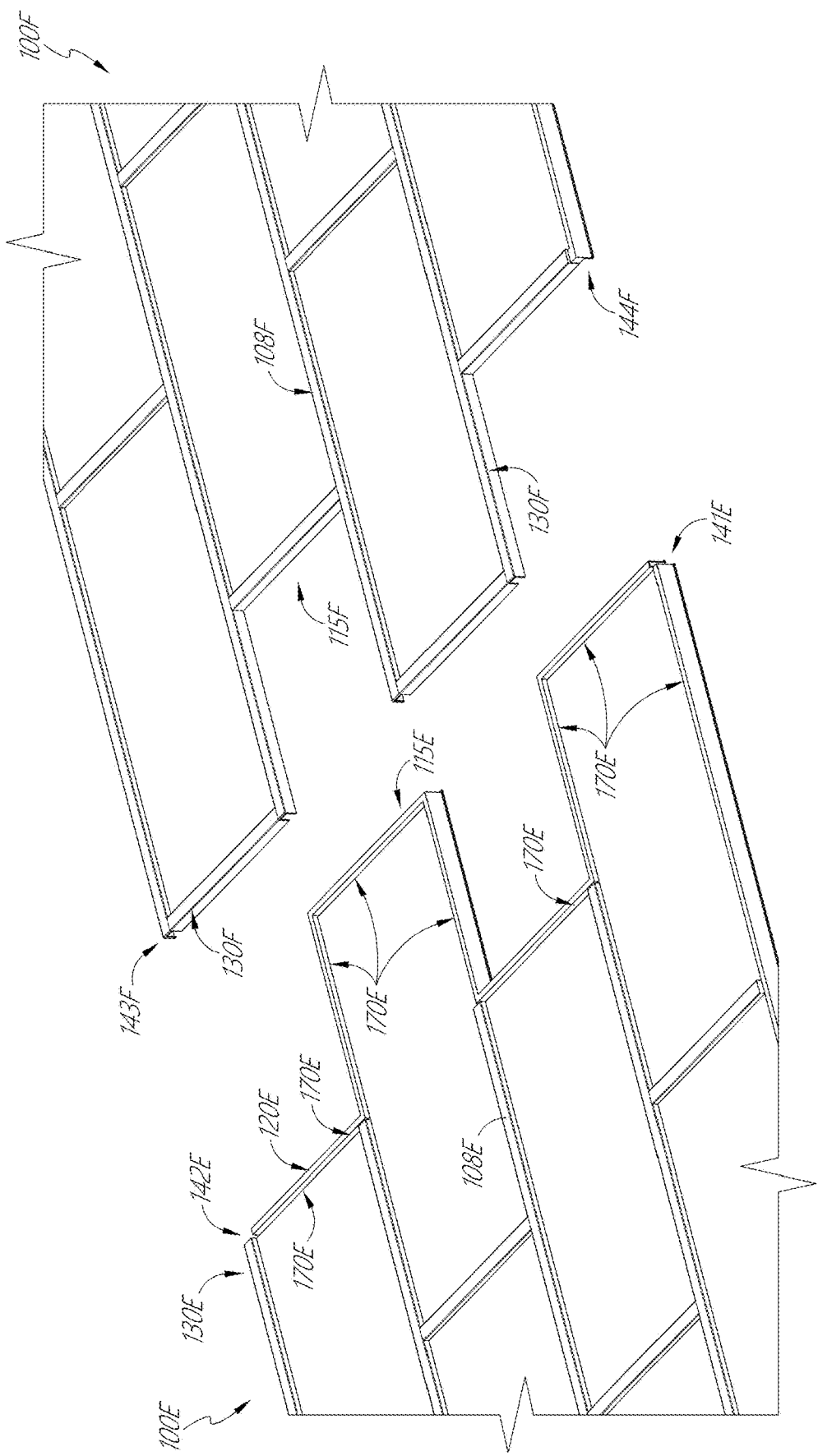
FIG. 20 is an exploded view of an assembly of two formliners.

FIG. 20 is an exploded view of an assembly of two adjacent formliners 100E and 100F. The formliner 100E may include a boundary 115E which may include an overlapped section 120E extending along a portion thereof. The formliner 100F may include a boundary 115F that may have an overlapping section 130F extending along a portion thereof. The overlapped section 120E of the formliner 100E and the overlapping section 130F of the formliner 100F may be brought into contact or otherwise adjacent to one another. The overlapping section 130F may receive the overlapped section 120E. By "receive" it is meant that the overlapping section 130F may be overlaid (e.g., engaged, mated, coupled, assembled, connected and/or interconnected) onto or otherwise next to the overlapped section 120E.

The formliner 100E may be assembled with the formliner 100F by bringing the respective overlapped sections 120E and overlapping sections 130F together. The respective sections may be brought together in a variety of manners. The formliner 100E may be laid down on a platform of a framework, described in further detail herein, for example with respect to FIG. 22. The formliner 100F may be lowered onto the formliner 100E such that the overlapping section 130F overlaps with the overlapped section 120E. The formliner 100E may be laid down first and then the formliner 100F may be slid adjacent to the formliner 100E. Therefore, the various formliners may be brought together in a variety of ways. When the formliner 100F is brought together with the formliner 100E, the third corner 143F of the formliner 100F may be adjacent to the second corner 142E of the formliner 100E.

When the two formliners 100E, 100F are brought together, the overlapping section 130F of the formliner 100F may be adjacent to and engaged with the channel(s) 170E of the formliner 100E as discussed herein. The overlapping sections 130F of the formliner 100F may form a substantially continuous surface (e.g., substantially flush exterior surfaces of the ribs 102) with portions of the internal section 108E of the formliner 100E. Further, when the formliner 100E and the formliner 100F are assembled together, they may appear, for example, similar to the formliners 100A and 100D shown in FIG. 14, or similar to the formliners 100B and 100C as shown in FIG. 14.

As shown in FIG. 20, the two formliners 100E, 100F have complementary fingerjoint patterns. The fingerjoint pattern of formliner 100E extends from the third corner 143E along the overlapped section 120E. A portion of this fingerjoint pattern is shown. Similarly, the fingerjoint pattern of formliner 100F extends from the second corner 142F along the overlapping section 130F. A portion of this fingerjoint pattern is shown. The two fingerjoint patterns are complementary to each other such that when the two formliners 100E, 100F are brought together they will form an elongated formliner assembly that is longer than any one individual formliner 100E, 100F.

Figure 21:
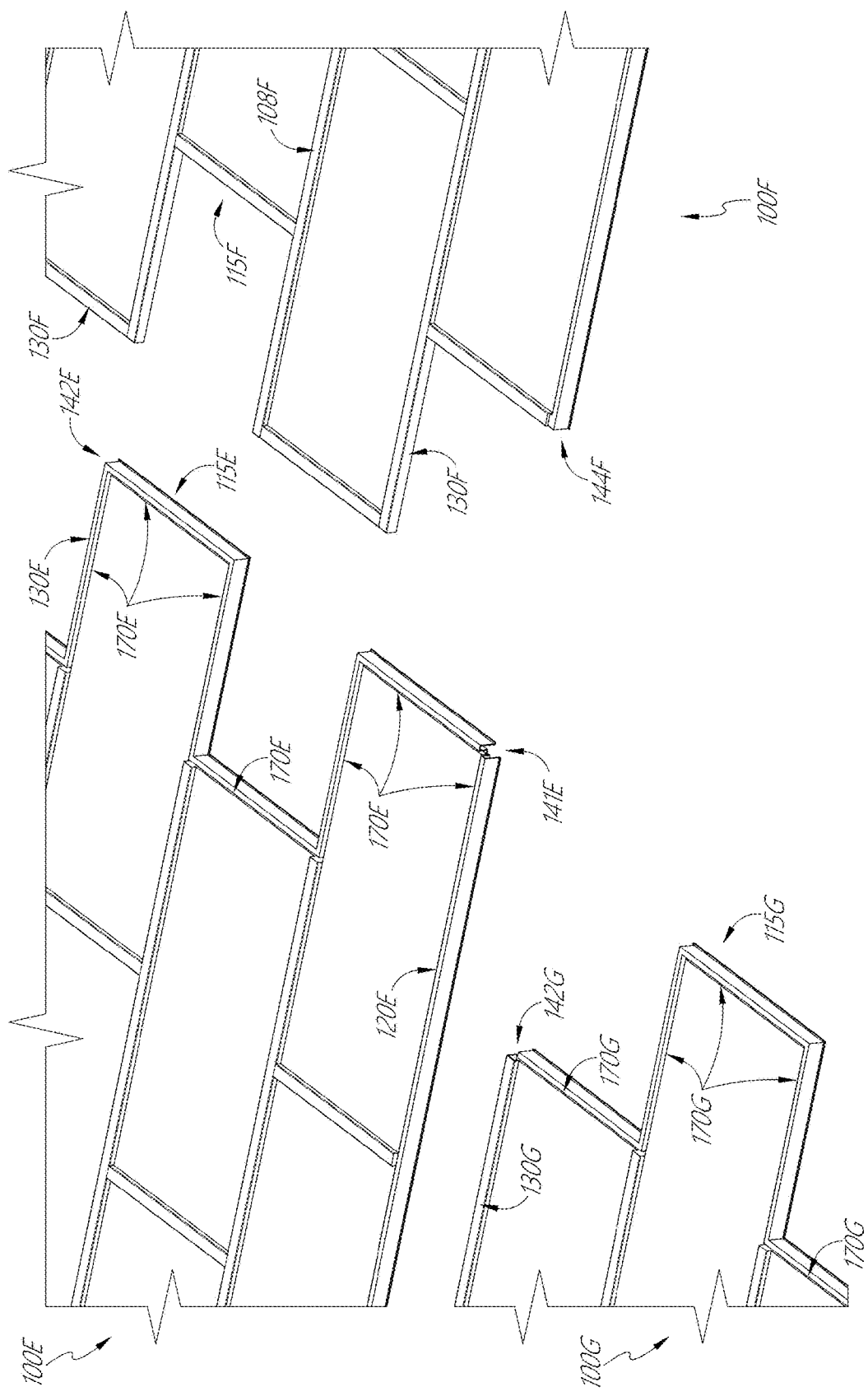
FIG. 21 is an exploded view of an assembly of three formliners.

FIG. 21 is an exploded view of three formliners 100E, 100F, 100G assembled together. The formliners 100E and 100F may be assembled in a similar manner as described with respect to FIG. 20. The formliner 100G may be assembled with the formliners 100E and 100F. As discussed above, the third corner 143F of the formliner 100F may be adjacent to the second corner 142E of the formliner 100E when the three formliners 100E, 100F, 100G are assembled together. As shown, the fourth corner 144F of the formliner 100F may be adjacent to the second corner 141E of the formliner 100E when the three formliners 100E, 100F, 100G are assembled together. Further, the overlapping section 130G of the formliner 100G may be adjacent to the portion of the overlapped section 120E of the formliner 100E that is adjacent to the overlapping section 130G as oriented in the figure. Therefore, the portion of a boundary 115G of the formliner 100G may be adjacent to this portion of the overlapped section 120E of the formliner 100E when the three formliners 100E, 100F, 100G are assembled together.

The formliner 100E and the formliner 100F may first be assembled together and then the formliner 100G may be assembled with the two assembled formliners 100E, 100F. In some implementations, the formliner 100E and the formliner 100G may first be assembled together and then the formliner 100F may be assembled with the two assembled formliners 100E, 100G. A fourth formliner can be assembled after assembling formliner 100G such that the fourth formliner couples with formliners 100F, 100G as discussed herein. However, this is merely one example. The formliner 100E may first be assembled with the formliner 100G, and then the formliner 100E may be assembled with the formliner 100F. The formliners 100E, 100G may be laid down on a platform of a framework, and then the formliner 100F (before or after the fourth formliner) may be assembled simultaneously with the formliners 100E, 100G. These are merely some examples of how the formliners may be assembled together, and many other suitable assemblies maybe implemented.

The formliner 100G may also include an overlapped section 120G as shown. This overlapped section 120G may be assembled with an overlapping section of the fourth formliner as discussed herein.

Figure 22:
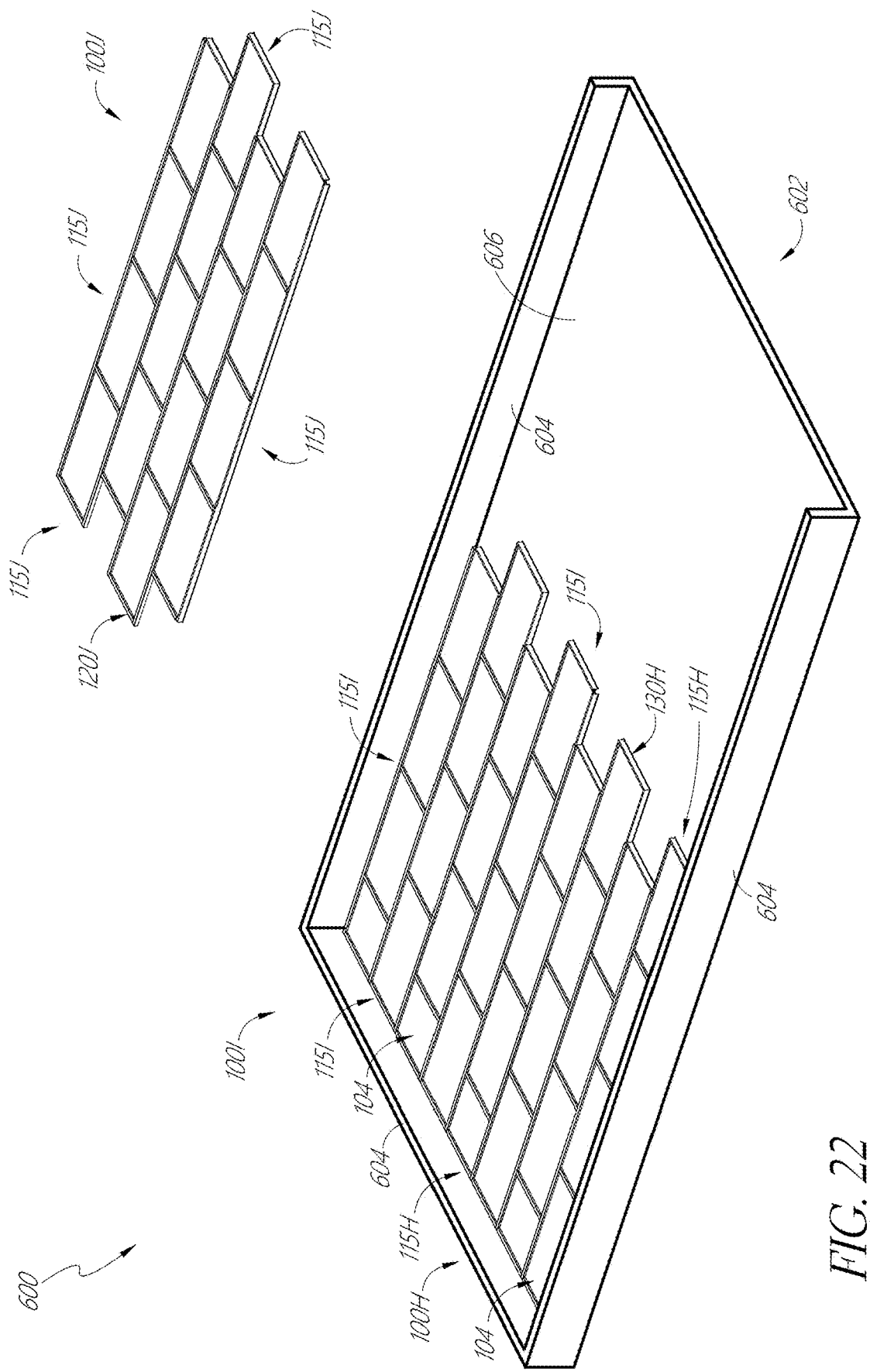
FIG. 22 is a perspective view of an assembly of a framework and several formliners to be used with the framework for forming a pattern in a curable material.

FIG. 22 is a perspective view of an assembly 600 including various formliners and a framework 602. The formliners may be assembled together with the framework 602 in order to orient the formliners properly. The framework 602 may further constrain or substantially prevent/inhibit movement of the formliners in a desired position while the curable material is poured thereon to form a pattern.

The framework 602 may include a perimeter segment 604 that encloses the formliners therein. The perimeter segment 604 may be a wall as shown that may enclose the formliners therein and/or substantially prevent/inhibit the curable material from spilling outside the framework 602. The perimeter may have a height (e.g., vertical length) greater than a height (e.g., vertical length) to substantially prevent/inhibit the curable material from spilling outside the framework 602. The perimeter segments 604 may be "two by fours." There may be three or four perimeter segments 604 that form, respectively, a partially or fully an enclosed space therein.

The assembly 600 may include a platform 606 (e.g., a backing, base, bottom, support surface, plane, including support surface 406 as discussed herein). The perimeter segments 604 may be on or adjacent to the platform 606. The platform 606 may be a generally planar surface on or to which the formliners may be positioned or attached. The platform 606 may be sheet-metal or plywood or other suitable materials to which the perimeter segments 604 may be connected and on which the formliners may be received. Bottom surfaces 111 and/or third walls 240 (e.g., free ends 241) may wholly, partially, substantially contact, abut, come against the platform 606 to provide support, structural integrity (substantially resistance to deformation given a desired curable material), and weight bearing capabilities to the respective formliners. For example, where the base 103 (and correspondingly the bottom surface 111) may have a textured patterns such that some portions or parts of the bottom surface 111 contact the platform 606.

It is understood that while three perimeter segments 604 are shown attached to the platform 606, another perimeter segment 604 may also be connected to enclose the formliners on all lateral sides of the platform 606. Further, the assembly of the various perimeter segments 604 may all be made from the same continuous, monolithic piece of material.

The assembly 600 may include the formliners 100H, 100I, 100J. The formliner 100H may be positioned next to the formliner 100I within the framework 602. A boundary 115H of the formliner 100H may be contacting one or more of the perimeter segments 604 of the framework 602. Similarly, a boundary 115I of the formliner 100I may contact one or more of the perimeter segments 604. The boundaries of the formliners may contact the framework 602 in more than one location. For example, the boundary 115I of the formliner 100I may contact the perimeter 604 of the framework 602 along two sides of the formliner 100I. One end of the formliner 100I with a fingerjoint pattern along the boundary 115I may contact one perimeter segment 604 of the framework 602, while another side of the formliner 100I at a different part of the boundary 115I may contact a different perimeter segment 604 of the framework 602. As shown, projecting cells 104 adjacent or near the perimeter segment 604 can be trimmed or cut such that a continuous pattern may be formed in the curable material starting from the perimeter segments 604.

A third formliner 100J may be assembled with the two formliners 100H, 100I within the framework 602. As shown, the formliner 100J may have a boundary 115J which may be brought to contact the boundary or boundaries of the other formliners in the framework. For example, the boundary 115J may be brought to contact the boundary 115I of the formliner 100I. The boundary 115J may also be brought to contact various portions of the framework 602. For example, a portion of the boundary 115J may be brought to contact the perimeter segment 604 of the framework 602. The formliner 100J may also be brought to rest on the platform 606 of the framework 602. The boundary 115J of the formliner 100J may therefore partially contact the boundary 115I of the formliner 100I and partially contact one or more of the perimeter segments 604 of the framework 602. The boundary 115J of the formliner 100J may be brought to contact the boundary 115H of the formliner 100H. These are merely some examples of how the assembly 600 may be assembled, and other suitable configurations may be implemented. Similarly, a fourth or many more formliners may be joined within the framework 602.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A formliner for use in creating a pattern in curable material, the formliner comprising:
   a cell comprising a base configured to face curable material, the base configured to create a pattern in the curable material;
   a rib system comprising a plurality of ribs extending along the cell and forming at least a part of a boundary of the cell, the plurality of ribs comprising:
      a first section connected with the cell and comprising a first rib end, the first section configured to face the curable material in use; and
      a second section connected with the cell and comprising a second rib end, at least a portion of the first section configured to overlap onto at least a portion of the second section; and
   a channel connecting at least a part of the cell to at least one rib of the plurality of ribs, the channel configured to accept the first rib end in the channel,
   wherein at least a portion the first rib end is in the channel with the at least a portion of the first section overlapping onto the at least a portion of the second section, and
   wherein the second section comprises a wall extending out of the channel, the wall extending out of the channel perpendicular to a general extent of the base of the cell.

2. The formliner of claim 1, wherein the wall comprises a lower portion at least partially formed by an intersection of the wall and a bottom of the channel.

3. The formliner of claim 2, wherein the intersection of the wall and the bottom of the channel is a sharp point.

4. The formliner of claim 2, wherein the lower portion of the wall extends along the wall toward an other wall of the second section.

5. The formliner of claim 4, wherein the other wall of the second section is perpendicularly connected to the wall of the second section.

6. The formliner of claim 1, wherein the channel is positioned to extend toward a support surface.

7. The formliner of claim 1, wherein the first rib end of the first section is not within a cell volume of the cell with the at least a portion of the first section overlapping onto the at least a portion of the second section, the cell volume extending between the plurality of ribs of the cell.

8. The formliner of claim 1, wherein the base has a contour along the general extent of the base, the contour changing with a predetermined magnitude at a boundary of the cell along the general extent of the base, and wherein the first rib end has an extent equal to or greater than the predetermined magnitude.

9. The formliner of claim 8, wherein the contour has a maximum magnitude in the cell, and wherein the maximum magnitude of the contour is greater than the predetermined magnitude at the boundary of the cell along the general extent of the base.

10. The formliner of claim 1, wherein the second rib end extends past the base of the cell with the at least a portion of the first section overlapping onto the at least a portion of the second section.

11. The formliner of claim 1, wherein the channel extends along at least a portion of the boundary of the cell and along at least a portion of a boundary of at least one other cell of the formliner.

12. The formliner of claim 1, wherein the first section comprises a first wall, a second wall connected to the first wall of the first section, and a third wall connected to the second wall of the first section, wherein the second section comprises a first wall, a second wall connected to the first wall of the second section, and a third wall connected to the second wall of the second section, wherein the wall of the second section is the first wall of the second section, wherein the first wall of the first section is configured to overlap the third wall of the second section, wherein the second wall of the first section is configured to overlap the second wall of the second section, and wherein the third wall of the first section is configured to overlap the first wall of the second section.

13. The formliner of claim 12, wherein the first, second, and third walls of the first and second sections are at substantially right angles to each other.

14. The formliner of claim 1, wherein the channel and the cell connect to form an edge between the cell and the channel.

15. The formliner of claim 14, wherein the edge is spaced from the wall along the general extent of the base of the cell.

16. The formliner of claim 14, wherein the edge is formed from the channel connecting to the base of the cell at substantially 90 degrees.

17. The formliner of claim 1, wherein the channel has a width generally corresponding to a thickness of the formliner.

18. The formliner of claim 1, wherein the second section of comprises a cutout such that the first section does not overlap a part of the second section corresponding to the cutout with the at least a portion of the first section overlapping onto the at least a portion of the second section.

19. The formliner of claim 1, wherein the formliner comprises a first end and a second end, the first end being formed to include a first finger joint pattern and the second end being formed to include a second finger joint pattern that is complementary to the first finger joint pattern, wherein the first end is configured to be overlaid with the second end to connect two or more formliners.

20. The formliner of claim 1, wherein the formliner comprises a plurality of cells that comprise opposing ends, the plurality of cells being arranged in a plurality of rows with each row having at least two cells disposed end-to-end, wherein the plurality of cells comprise the cell of the formliner.

21. The formliner of claim 20, wherein cells of a first row of the plurality of rows are offset from cells of a second row of the plurality of rows.

22. A method for assembling formliners, the method comprising:
connecting a first formliner with a second formliner by overlaying at least a portion of an overlapping section of a rib of the second formliner onto at least a portion of an overlapped section of a rib of the first formliner, the overlapping section of the rib of the second formliner configured to face curable material positioning at least a portion of a first rib edge of the overlapping section of the rib of the second formliner into a groove of the first formliner, the groove of the first formliner extending between the rib of the first formliner and a cell of the first formliner; and while positioning the at least a portion of the first rib edge of the overlapping section of the rib of the second formliner into the groove of the first formliner, positioning the at least a portion of the first rib edge of the overlapping section of the rib of the second formliner against a wall extending out of the groove, the wall extending out of the groove perpendicular to a general extent of a base of the cell of the first formliner.

23. The method of claim 22, further comprising positioning the groove to extend toward a support surface.

24. The method of claim 22, further comprising connecting the first and second formliners with at least one other formliner by overlaying at least a portion of an overlapping section of a rib of the at least one other formliner onto at least an other portion of the overlapped section of the rib of the first formliner.

25. The method of claim 24, while connecting the first, second, and at least one other formliners, positioning at least a portion of a first rib edge of the overlapping section of the rib of the at least one other formliner into the groove of the first formliner.

* * * * *